United States Patent
Liaw et al.

(10) Patent No.: US 7,577,162 B2
(45) Date of Patent: Aug. 18, 2009

(54) METHODS FOR ALLOCATING TRANSMISSION BANDWIDTHS OF A NETWORK

(75) Inventors: Yi-Ching Liaw, Hsinchu (TW); Yun-Lung Chou, Hsinchu (TW); Zone-Chang Lai, Taichung (TW); Yeong-Chang Maa, Jhudong Township, Hsinchu County (TW); Chia-Chieh Tuanmu, Pingtung (TW); Chu-Hsun Chang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 446 days.

(21) Appl. No.: 11/363,941

(22) Filed: Mar. 1, 2006

(65) Prior Publication Data
US 2007/0064732 A1    Mar. 22, 2007

(30) Foreign Application Priority Data
Sep. 16, 2005    (TW) .............................. 94132107 A

(51) Int. Cl.
*H04J 3/16* (2006.01)
(52) U.S. Cl. ...................... 370/468; 370/235
(58) Field of Classification Search ............... 370/464, 370/465, 468, 477, 229, 230, 235; 725/86, 725/87, 91, 93, 95, 96
See application file for complete search history.

(56) References Cited

U.S. PATENT DOCUMENTS

| | | | |
|---|---|---|---|
| 6,438,141 B1* | 8/2002 | Hanko et al. | 370/477 |
| 2002/0075844 A1* | 6/2002 | Hagen | 370/351 |
| 2003/0048805 A1* | 3/2003 | Yoshihara et al. | 370/468 |

OTHER PUBLICATIONS

Assi et al., *Dynamic Bandwidth Allocation for Quality-of-Service Over Ethernet PONs*, Nov. 2003, IEEE Journal On Selected Areas In Communications, vol. 21, No. 9, pp. 1467-1477.

* cited by examiner

*Primary Examiner*—Ricky Ngo
*Assistant Examiner*—Paul Masur
(74) *Attorney, Agent, or Firm*—Rabin & Berdo, P.C.

(57) ABSTRACT

Methods for allocating transmission bandwidths of a network are provided. The allocation ratio of anticipation bandwidths is adjusted according to the loading of the network to calculate the requested bandwidths, thereby effectively reducing an average delay and enhancing the utility rate of the network. Further, remaining bandwidth of the network is allocated based on maximum used bandwidth and bandwidth compensation of each terminal during the transmission cycle, to allocate excess bandwidth for each terminal. Therefore, the transmission bandwidth allocation is fairer, and delay is reduced. Upstream order of each terminal is transferred based on its requested bandwidth, thereby effectively reducing the average delay.

22 Claims, 21 Drawing Sheets

METHODS FOR ALLOCATING TRANSMISSION BANDWIDTHS OF A NETWORK

CROSS-REFERENCE TO RELATED APPLICATIONS

This non-provisional application claims priority under 35 U.S.C. § 119(a) on Patent Application No(s). 094132107 filed in Taiwan, R.O.C. on Sep. 16, 2005, the entire contents of which are hereby incorporated by reference.

BACKGROUND

1. Field of Invention

The invention relates to a method for uploading data, and in particular to a method for allocating transmission bandwidths of a network.

2. Related Art

For a long time now bandwidth allocation has been an important subject in designing a network system. Taking a passive optical network (PON) as an example, multiple optical network units (ONU) are disposed at a corresponding number of offices or houses, using passive devices to couple to a single optical line terminal (OLT). In other words, an optical line terminal located at one end connects to an optical couple device, which is near a terminal (client side), by an optical fiber, and then goes to the optical network unit. Here, data can be transmitted to the optical network unit by the broadcasting of the optical line terminal, which is called a downloading process. On the other hand, as shown in FIG. 1, an uploading process means an optical network unit performs a time division multiplexing (TDM) process to transmit the data to the optical line terminal. While uploading data, the uploading bandwidth is shared by all optical network units, therefore bandwidth allocation directly affects transmission speed when uploading data and the efficiency of the bandwidth. However, the current method of allocating bandwidth cannot provide the required properties such as low transmission delay, high bandwidth efficiency and fairness of bandwidth allocation.

Traditionally, each optical network unit is allocated at the same portion of a whole bandwidth (i.e. in one time division multiplexing channel) and the transmissions of those optical network units are synchronized to prevent collision (e.g. two or more optical network units have partially overlapping transmission). For instance, in the related art, N pieces of optical network units are separately assigned to a time slot and adapted to it. Every optical network unit can transmit any number of data package as shown in FIG. 2. Here, if some package cannot complete the transmission in the current time slot, this package must be retained and wait until the next time slot to transmit. Although there will be no collisions and package separations occurring in this method, this time slot allocation method with circulation fixing cannot handle a situation like bursting net flow.

Therefore, a dynamic bandwidth allocating method has been provided. This method is able to reduce the corresponding size of time slots when no data package is transmitted, and give the remainder of the bandwidth to other optical network units to use. However, according to this method, in order to receive time slot assignments precisely, the optical line terminal must acknowledge how many bits of data packages are waiting in every optical network unit before the assignment. Here, every optical network unit transmits a specific message to inform the optical network terminal how many bits of data packages are sent before the data transmission. Then the optical line terminal is able to estimate and allocate the bandwidth to the optical network unit which is going to transmit a data package, inform the optical network unit about the transmittable bandwidth, and start data package transmission. During the uploading process, the optical line terminal monitors the transmission by the optical network unit in a proper order for arranging the transmission timing of the next optical network unit, so that it can receive the next transmitting data package from the next optical network unit after the last data transmission.

In the dynamic bandwidth allocation structure, lots of algorithms for the dynamic bandwidth allocation are provided. For example, U.S. patent application 20030048805 A1 provides an algorithm for the dynamic bandwidth allocation, shown in FIG. 3. In this figure, this method sets up an assured bandwidth B_min$_j$ for every optical network unit, where j is the number of the terminals with the requested bandwidth, or the number of optical network units with the requested bandwidth. In other words, if a usable bandwidth of the nth cycle is B_ref, the usable bandwidth of the optical network unit in the nth cycle will be allocated based on the proportion of the assured bandwidth B_min$_j$. After that, in the nth cycle, an ideal usable bandwidth B_ideal$_{j,n}$ for every optical network unit with requested bandwidth can be obtained by the allocated usable bandwidth subtracting the compensation value B_add$_{j,n-1}$. Next, bandwidth allocation proceeds. When the ideal bandwidth B_ideal$_{j,n}$ of the optical network unit is larger than 0, the allocated transmittable bandwidth B_temp$_{j,n}$ of the optical network unit is the bandwidth Q$_{j,n}$ requested; otherwise the allocated transmittable bandwidth B_temp$_{j,n}$ is 0. After the bandwidth allocation is completed and the compensation value B_add$_{j,n}$ is recalculated, the allocation of the uploading bandwidth for the optical network unit is completed.

The compensation value is the sum of overspent bandwidths accumulated before this cycle of each optical network unit. When the compensation value is larger than 0, there is an overspent bandwidth before this cycle. On the other hand, when the compensation value is smaller than 0, there is a remaining bandwidth before this cycle.

Under this structure, although a fairness of bandwidth allocation can be obtained, problems remain. If the optical network unit doesn't use many bandwidths for a long time, the remaining bandwidth will be largely accumulated. And when this optical network unit suddenly produces a large amount of bandwidth requests, a large amount of bandwidth will be exhausted, leading to a longer transmitting delay to other optical network units. On the other hand, if the optical network unit maintains a large amount of bandwidth requests for a long time, a usable ideal bandwidth can hardly be stable, leading to a large jittering of the transmitting delay.

In addition, other related documents show another dynamic bandwidth allocation algorithm. See Chadi M. Assi, Yinghua Ye, Sudhir Dixit, and Mohamed A. Ali, "Dynamic Bandwidth Allocation for Quality-of-Service Over Ethernet PONs, "IEEE Journal on Selected Areas in Communications, Vol. 21, No. 9, November 2003, pp. 1467-1477. This method allocated the usable bandwidth to each optical network unit based on the assured bandwidth and the requested bandwidth in this cycle, and then allocated the overspent bandwidth (i.e. the remaining usable bandwidth) based on the requested bandwidth, which is represented by the following formula.

$$B\_grant_j = \begin{cases} R_j, & \text{if } R_j \leq B\_min_j \\ B\_min_j + B\_excess_j, & \text{if } R_j > B\_min_j \end{cases} \quad (1)$$

$$B\_min_j = \frac{(T_{cycle} - N \times T_g) \times r}{8} \times w_j \quad (2)$$

$$B\_excess_j = \frac{B\_left \times R_j}{\sum_{k \in K} R_k} \quad (3)$$

Here, the formula (1) is the basic method for the major bandwidth allocation, where Rj is the requested bandwidth for every optical network unit; $B\_min_j$ is the assured bandwidth for every optical network unit; $B\_excess_j$ is the excess bandwidth reallocated to the optical network unit with the remaining bandwidth; and $B\_grant_j$ is the bandwidth (i.e. transmittable bandwidth) the optical network unit actually received. According to the formula (1), when the requested bandwidth is smaller or equal to the assured bandwidth, the optical network unit receives the bandwidth requested; otherwise the optical network unit receives the excess bandwidth in addition to the assured bandwidth. Here, the assured bandwidth can be calculated by the formula (2), where $T_{cycle}$ is the cycle time; N is the number of the optical network units; $T_g$ is the switching time of the optical network unit; r is the transmitting rate; and $w_j$ is the assured bandwidth weight value of the optical network unit, which is determined by the costumer contract. Furthermore, the excess bandwidth can be calculated by the formula (3), where B_left is the remaining bandwidth of the usable bandwidth in this cycle after the allocation of the assured bandwidth, and K is a class of the massive loading (i.e. the requested bandwidth is larger than the assured bandwidth) optical network units, which is represented by $K=\{R_j>B\_min_j\}$.

Although this framework can use the remaining bandwidth effectively, it allocates the remaining bandwidth based on the proportion of the requested bandwidth of the optical network unit, which is not fair. So costumers who only buy less bandwidth may have large amounts of transmittable bandwidth to use just because they request it.

Therefore, another method was provided to use the flow prediction process to previously allocate the spare bandwidth in order to reduce the holding time of the high priority data, which is accomplished by the following formulas.

$$R_j = (H_j + E\_wait_j(n)) + M_j + L_j \quad (4)$$

$$E\_wait_j(n) = A\_wait_j(n-1) \quad (5)$$

According to the formula (4), the requested bandwidth of the optical network unit consists of requested band widths with high ($H_j$), medium ($M_j$), and low, ($L_j$) priorities, where a flow prediction value ($E\_wait_j(n)$) is added to the high priority part and n is the number of the cycles. From the formula (5), $A\_wait_j(n-1)$ represents the amount of data actually reaching high priority in the holding period of the n-1th cycle. This shows that the flow prediction value ($E\_wait_j(n)$) is the requested bandwidths for high priority reaching the holding period of the last cycle.

However, although this process can reduce the averaged transmission delay of the high priority data, it increases the average transmission delay of other priority data and the inaccuracy of the flow prediction reduces the efficiency of the bandwidth.

Thus, how to effectively provide low delay transmission, high bandwidth efficiency and fairness of bandwidth allocation becomes very important research in this bandwidth allocation field.

SUMMARY

According to the invention, a method for allocating network bandwidth is provided where the network includes an office terminal and multiple terminals connecting to the office terminal. This method includes: receiving a predicting bandwidth and a transmitting wait bandwidth of a terminal; adjusting the predicting bandwidth based on a weight value; and adding the adjusted predicting bandwidth to the transmitting waited bandwidth to obtain a requested bandwidth for every terminal. The requested bandwidth used as a basis for the office terminal to determine the amount of data can be uploaded by the terminal through the network. Here the weight value may decrease with the increase of the extent of the network loading.

According to the invention, another method of allocating network bandwidth is further provided where the network includes an office terminal and multiple terminals connecting to the office terminal. This method includes: receiving a requested bandwidth of at least one terminal; allocating the transmitting bandwidth based on the assured bandwidth and the requested bandwidth of every terminal; identifying the requested bandwidth based on the allocated transmitting bandwidth; when there exists an unsatisfied requested bandwidth, allocating at least one excess bandwidth to the terminal with the corresponding unsatisfied requested bandwidth for adjusting the allocated transmitting bandwidth; and adjusting a bandwidth compensation value for every terminal based on the last transmitting bandwidth of the terminal.

The step of allocating excess bandwidth further includes the steps of: calculating a remaining bandwidth according to the usable bandwidth in a transmitting cycle and the allocated transmitting bandwidth of the network; calculating allocatable extra bandwidth of every terminal according to the maximum bandwidth and the bandwidth compensation value of every terminal and the remaining bandwidth; and allocating the excess bandwidth according to the unsatisfied requested bandwidth and the excess bandwidth of the terminal for adjusting the transmitting bandwidth of the terminal.

In order to prevent transmission delay from jittering over, every terminal will set up a maximum transmitting bandwidth limitation. Therefore, before or after the step of allocating the transmitting bandwidth to the corresponding terminal based on the assured bandwidth and the requested bandwidth of every terminal, every terminal's requested bandwidth can be adjusted first based on the maximum transmission bandwidth of each terminal. That is, when the requested bandwidth is larger than the maximum transmission bandwidth limitation, the maximum transmission bandwidth limitation is the requested bandwidth instead of the original requested bandwidth; otherwise the original requested bandwidth will be used. The maximum transmission bandwidth limitation could be set up between the maximum bandwidth and twice the maximum bandwidth.

The result of comparing the requested bandwidth and the assured bandwidth of the every terminal can be a basis to determine whether the requested bandwidth or the assured bandwidth is the transmitting bandwidth allocated to the corresponding terminal. When the requested bandwidth is smaller or equal to the assured bandwidth, a bandwidth corresponding to the requested bandwidth is allocated to the terminal. On the other hand, when the requested bandwidth is larger than the assured bandwidth, a transmitting bandwidth corresponding to the assured bandwidth is allocated to the terminal. Here when the requested bandwidth is larger than the assured bandwidth, an additional excess bandwidth is allocated to the terminal in addition to allocating the transmitting bandwidth of the corresponding assured bandwidth to the corresponding terminal.

The remaining bandwidth of the network is calculated first by the following formula;

$$B\_left_n = B\_total_n - \sum_{j=1}^{N} B\_min_j$$

wherein $B\_min_j$ is the transmitting bandwidth allocated to the terminal (i.e. the assured bandwidth), $B\_tatal$ is the usable bandwidth of the network in the nth transmission cycle (n is a positive); and $B\_left_n$ is the remaining usable bandwidth in this network (i.e. the remaining bandwidth after the initial allocation of the usable bandwidth of the network in this transmitting cycle). According to this formula, the remaining bandwidth is equal to the usable bandwidth of the network subtracting the allocated transmitting bandwidth to each terminal.

Next, calculate the allocatable excess bandwidth for every unsatisfied terminal by the following formula;

$$B\_extra_k = \frac{B\_max_k - B\_add_k}{\sum (B\_max_k - B\_add_k)} \times B\_left_n, k \in K$$

wherein $B\_max_k$ is the maximum bandwidth transmittable by the terminal; $B\_add_k$ is the sum of the overspent bandwidth accumulated before this cycle for every terminal (i.e. the bandwidth compensation value of the terminal); $B\_extra_k$ is the extra bandwidth allocatable to the terminal at present; and K is a class of the terminals corresponding to the unsatisfied requested bandwidth (i.e. the requested bandwidth $R_j$ is larger than the assured bandwidth $B\_min_j$), which is $K=\{R_j > B\_min_j\}$. Here, first follow the maximum $B\_max_k$ and the bandwidth compensation value $B\_add_k$ of every terminal to obtain a ratio of allocatable remaining bandwidth for every bandwidth. Then based on the ratio and the $B\_left_n$, the extra bandwidth $B\_extra_k$ allocatable to the terminal can be obtained. Among them, K and k are both positives.

Next, use the following formula to allocate the excess bandwidth based on the unsatisfied bandwidth and the extra bandwidth of the terminal;

$$B\_excess_k = \begin{cases} R\_left_k, & \text{if } R\_left_k \leq B\_extra_k \\ B\_extra_k, & \text{if } R_k > B\_extra_k \end{cases}, k \in K$$

Where $R\_left_j$ is remaining requested bandwidth obtained by the requested $R_j$ subtracting the allocated transmitting bandwidth (i.e. assured bandwidth $B\_min_j$), which is $R\_left_j = R_j - B\_min_j$. According to this formula, when the remaining requested bandwidth $R\_left_j$ is smaller or equal to the extra bandwidth $B\_extra_j$, an excess bandwidth $B\_excess_j$ corresponding to the remaining requested bandwidth $R\_left_j$ is allocated to the corresponding terminal; otherwise an excess bandwidth $B\_excess_j$ corresponding to the extra bandwidth $B\_extra_j$ is further allocated. Here the maximum bandwidth $B\_max_j$ and the assured bandwidth $B\_min_j$ can both be determined by the costumer contract.

Finally, update the bandwidth compensation value for every terminal based on the bandwidth overspent of the transmitting bandwidth after the allocation. That is, add the excess bandwidth to the bandwidth compensation and subtract the bandwidth which should give but without giving from the bandwidth compensation value in the next transmitting cycle. When the transmitting bandwidth is larger than the maximum bandwidth, the excess portion, which is the excess bandwidth obtained by the transmitting bandwidth subtracting the maximum bandwidth, is added to the bandwidth compensation value; on the other hand, when the allocated transmitting bandwidth is smaller than the maximum bandwidth, the non allocated portion (i.e. the un-used bandwidth obtained by the maximum bandwidth subtracting the transmitting bandwidth) or the remaining requested bandwidth after allocation (i.e. the un-used bandwidth obtained by the requested bandwidth subtracting the transmitting bandwidth) is subtracted from the bandwidth compensation value. Every terminal's bandwidth compensation value can be updated by this method.

Here, the reallocation process for the excess bandwidth can be repeatedly performed to satisfy most requested bandwidths. After the allocation, confirm whether there is an unsatisfied requested bandwidth or not. When there is an unsatisfied requested bandwidth, the reallocation of the excess bandwidth is once again performed. Besides, in order to prevent over allocation of the excess bandwidth, the allocation number can be added up after every allocation. Besides, a process is performed to confirm whether the amount reaches the predetermined value or not, while a check of whether there is an unsatisfied requested bandwidth is processed at the same time. The reallocation only proceeds when there is an unsatisfied requested bandwidth and the amount of allocation doesn't reach the predetermined value.

According to the invention, a method of allocating network bandwidth is further provided where the network includes an office terminal and multiple terminals connecting to the office terminal. This method includes: receiving all the requested bandwidth of the uploading messages delivered from the terminals; obtaining a transmitting sequence according to the order of the uploading messages; and adjusting every terminal's uploading orders in a proper order based on the size of the requested bandwidth for obtaining a modified transmitting sequence, where the modified transmitting sequence is used as a basis for the office terminal to determine which terminal should upload the bandwidth in order.

The step of adjusting every terminal's uploading orders in a proper order based on the size of the requested bandwidth to obtain a modified transmitting sequence includes: sequentially comparing the requested bandwidths of the two terminals abutting each other in uploading order. When a requested bandwidth of a lower order terminal is smaller than that of a higher order terminal, exchange the two terminals' orders to obtain the modified transmitting sequence.

Here, by repeatedly performing the step of adjusting every terminal's uploading orders, every terminal's uploading order is arranged to become a better sequence according to the amount of data uploaded. However, in order to prevent the uploading order of every terminal from changing too much, a predetermined value can be set up first. Also, after receiving the modified transmitting sequence, this modified transmitting sequence is checked to determine whether it is the same as the original transmitting sequence or not. If they are not the same, the changing number is added up and then confirmed as to whether it reaches the predetermined value. If the cumulated changing number doesn't reach the predetermined value, this process will go back to the adjusting step to base on the requested bandwidth to adjust the transmitting sequence again; on the other hand if the cumulated changing number does reach the predetermined number, the adjustment for the transmitting sequence will stop and the office terminal will use the last obtained modified transmitting sequence to be the order for determining the terminals to upload.

BRIEF DESCRIPTION OF THE DRAWINGS

The invention will become more fully understood from the detailed description given below, which is for illustration only and thus is not limitative of the invention, wherein.

DETAILED DESCRIPTION

Figure 1:
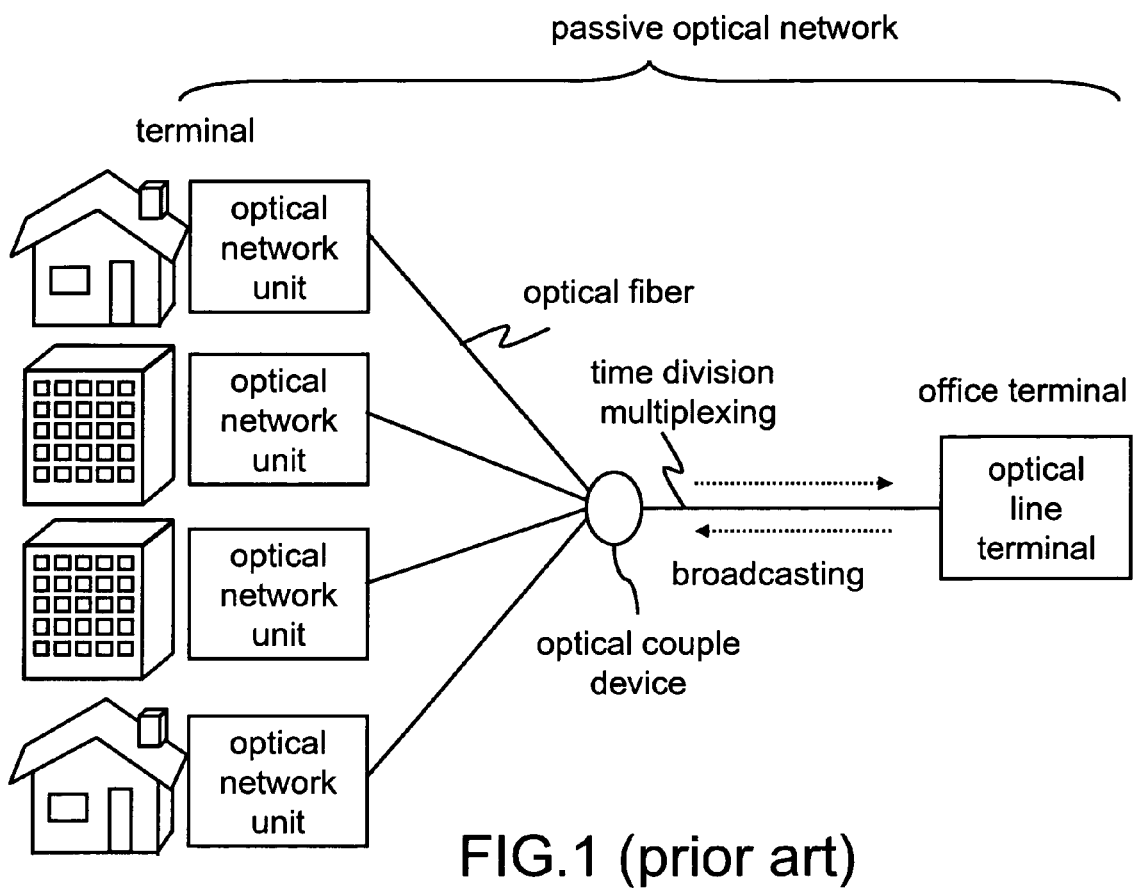
FIG. 1 is a diagram showing a basic structure of a conventional network.
Figure 2:
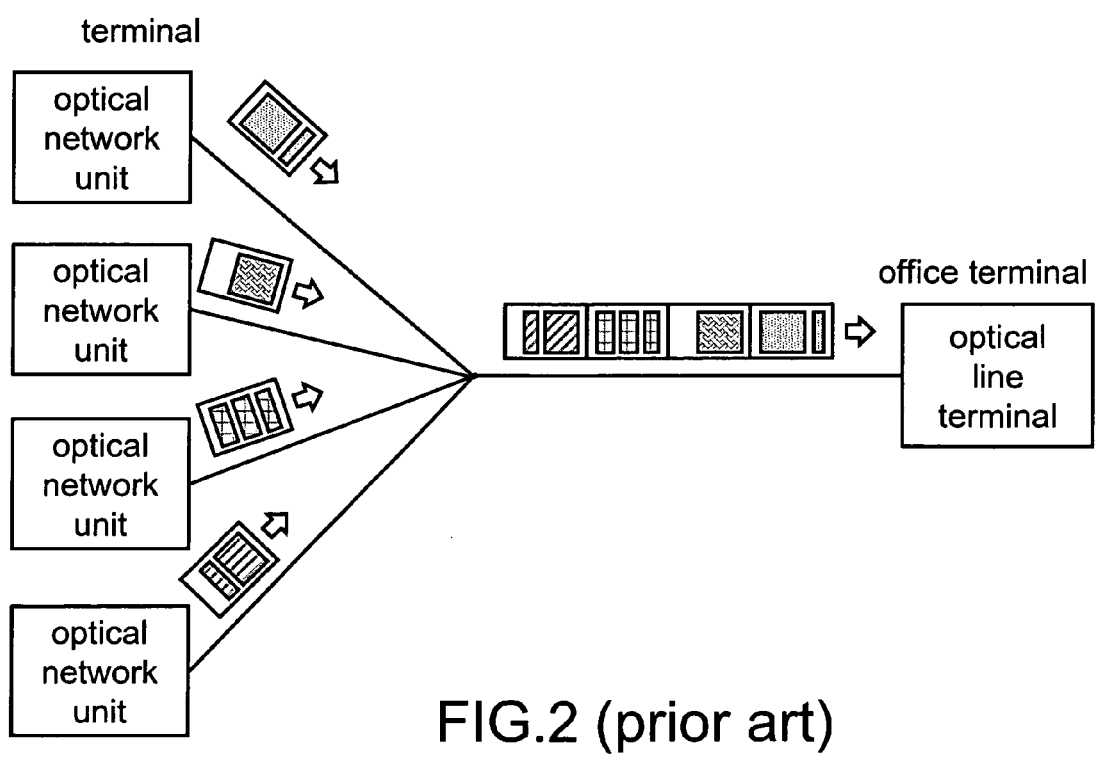
FIG. 2 is a diagram showing the method of uploading data in the conventional network of FIG. 1.
Figure 3:
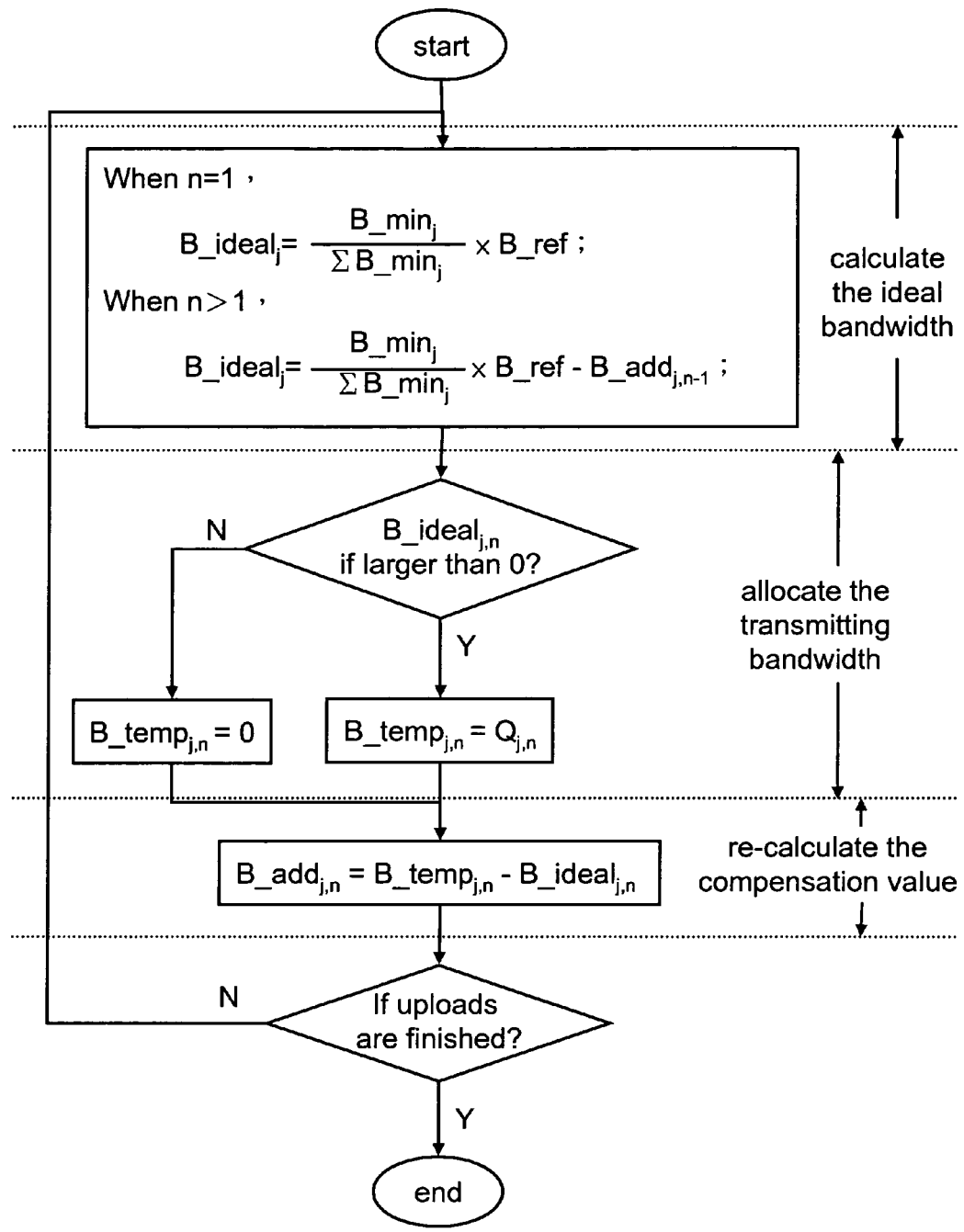
FIG. 3 is a diagram showing a conventional method of allocating the transmitting bandwidth.

In the embodiments below, the invention can apply to a network that includes an office terminal and multiple terminals connecting to the office terminal. Hardware that applies in the related art can also be disposed at the office terminal and the multiple terminals to carry out this network if appropriate.

For example, the applied network can be a passive optical network (PON), so there can be an optical line terminal (OLT) at the office terminal and an optical network unit (ONU) at each terminal. The optical network unit and the optical line terminal can separately have their own central processing unit (CPU) to control an operation of the media access control (MAC) logic circuit. Among them, every MAC logic circuit can be included in one single integrated circuit (IC), such as the MPC860TZP50 interface, the RS232 interface and the 10BaseT interface from Motorola. Besides, the optical network unit and the optical line terminal also can include a network processor chip such as the IXP1200 from Intel, the MXT-4000 series and the MXT-5000 series from Maker (Conexant), the Prism from Sitera and the nP3400 from MMC to perform the Ethernet network's packaging process. Here, the network processor chip also can include a MAC chip such as an application specific integrated circuit (ASIC) or a field programmable gate array (FPGA) to provide the access to the network. Also, these optical network units and the optical line terminal can further include a memory (ex. read-only memory, ROM) or a random-access memory (RAM) or can use an optical transponder to perform two way transmissions by an optical fiber. Although the network mentioned in this specification can use any kind of optical transponders, one of methods can include using a transponder that is capable of using in an integrated circuit and transmitting and receiving with 1.3 µm wave meter and 1.55 µm wave meter respectively (ex. a planar light wave circuit (PLC)), and using a forward feedback circuit (ex. a ROM) to work not instantaneously with a bursting first bit to work under a transmission speed of 1.25 Gbps. However, the hardware used in the optical network unit or the optical line terminal is not the key component of the invention, which means the invention can use any known hardware adapted to the invention.

The processes mentioned below are generally performed by the above MAC chip, including the access to the network. It also can be performed by software which is executed and loaded by a CPU. The CPU is separated from but coupled to the MAC chip of the network.

In order to accomplish a network transmission bandwidth allocation method of the invention, there are three bandwidth allocation methods provided respectively for adjusting the transmitting sequence based on the amount of uploading data, predicting the bandwidth allocation ratio based on the extent of network loading and allocating the transmitting bandwidth for conforming to the fairness of bandwidth allocation.

In an embodiment, the allocation for the network transmitting bandwidth is improved by the estimate of the predicting bandwidth. Here, the predicting bandwidth can be estimated by the following formula.

$$R_j = Q_j + E_j \times W(L) \qquad (6)$$

In this formula, $R_j$ is the estimated requested bandwidth of the terminal, $Q_j$ is the data amount waiting for transmission in the terminal, $E_j$ is the data amount expected to reach the terminal in a holding time, L is the extent of network loading in this transmitting cycle and W(L) is the weight value changed with the extent of the network loading. Thus, according to the formula (6), the allocation ratio of the predicting bandwidth will be adjusted based on the extent of the network loading.

J is the number of service terminals requesting bandwidth as well as the number of the terminal of request bandwidth. Therefore, in a network, the office terminal can base on the estimated requested bandwidth to estimate the requested bandwidth of the terminal one by one by the formula (6) and further determine the amount of data (i.e. transmitting bandwidth) can be upload for uploading messages sent by the corresponding terminal.

Figure 4:
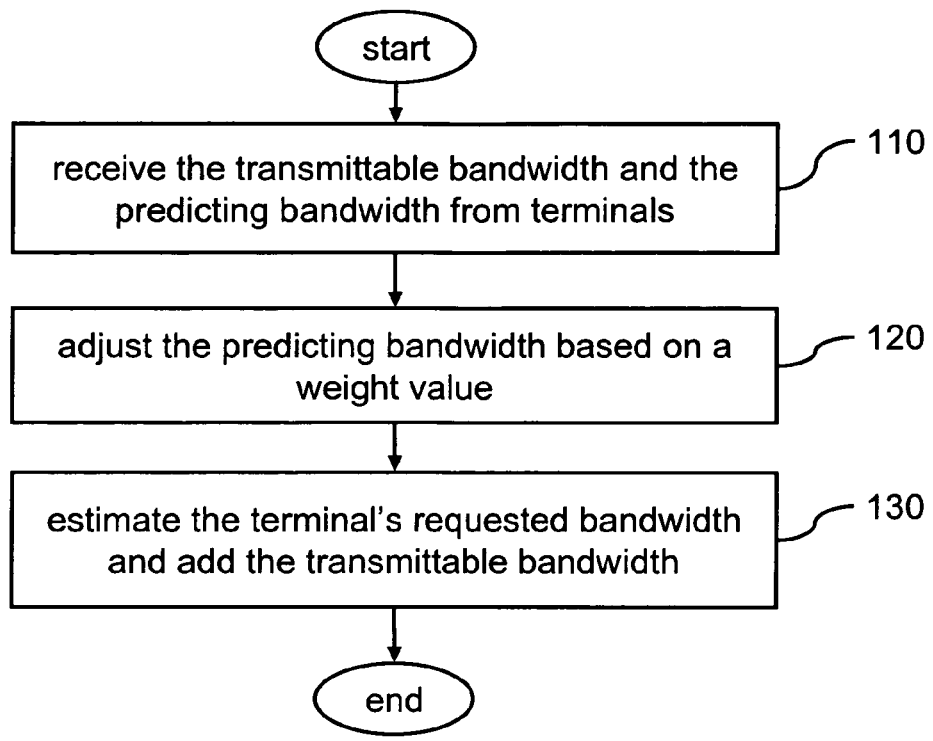
FIG. 4 is a flow chart showing an embodiment of a method for allocating a bandwidth of a network according to the present invention.

Please refer to FIG. 4. In a transmitting cycle, first receive the transmittable bandwidth and the predicting bandwidth of the terminal (step 110); then adjust the predicting bandwidth based on a weight value (step 120); next estimate the terminal's requested bandwidth by the formula (6) and add the transmittable bandwidth to the modified predicting bandwidth to obtain the final requested bandwidth (step 130).

Figure 5:
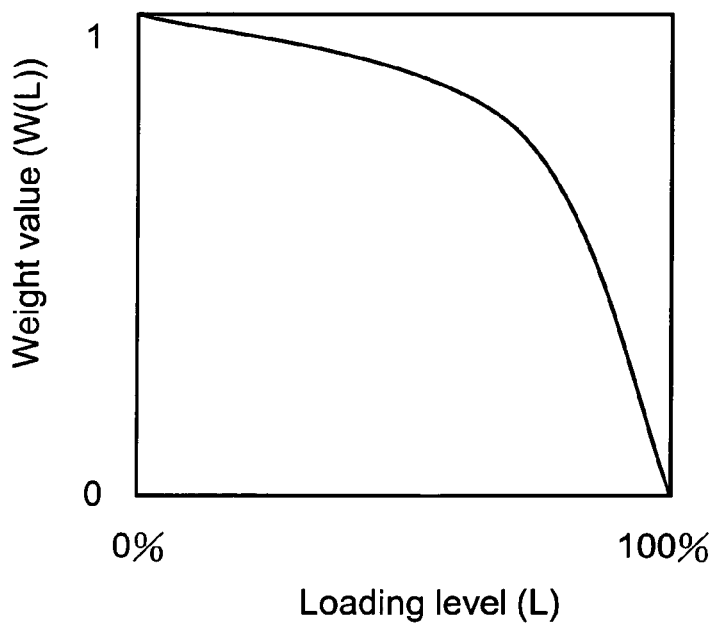
FIG. 5 shows an embodiment of the relationship between the weight value of FIG. 4 and the loading extent of the network.
Figure 6:
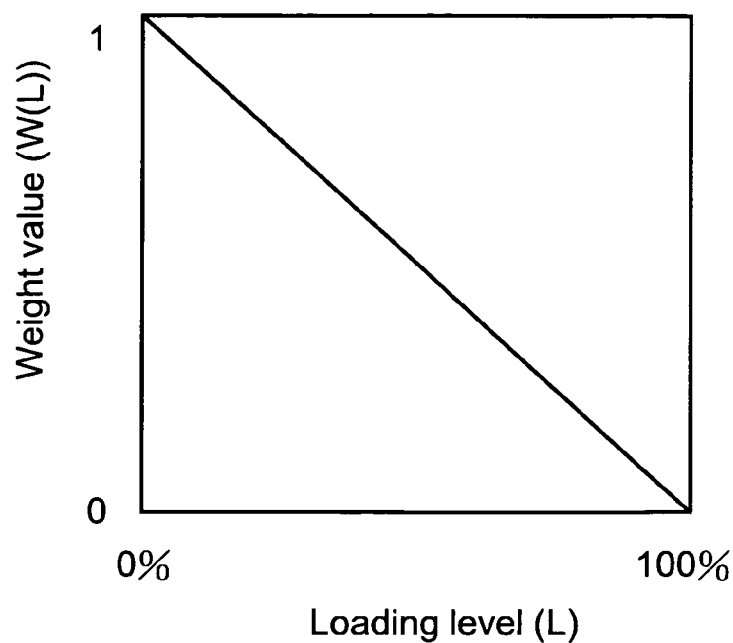
FIG. 6 shows another embodiment of the relationship between the weight value of FIG. 4 and the loading extent of the network.
Figure 7:
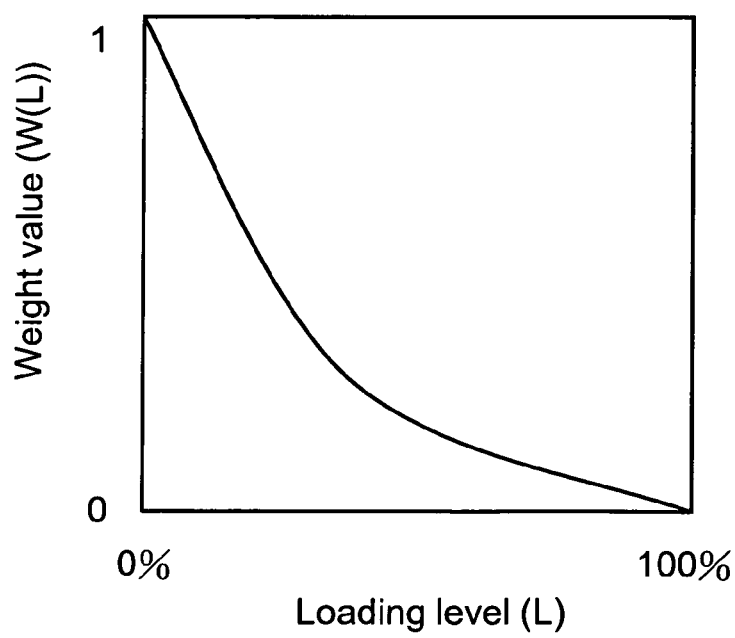
FIG. 7 shows still another embodiment of the relationship between the weight value of FIG. 4 and the loading extent of the network.

Here, in order to prevent wasting the bandwidth, which is contributed by the prediction error in predicting the bandwidth $E_j$, a larger weight value W(L) can be introduced when the loading of the network is low; on the other hand, a smaller weight value W(L) can be introduced when the loading of the network is heavy. That is, the weight value W(L) decreases with the increase of the extent of network loading L. The relationship between W(L) and L are shown in FIGS. 5, 6 and 7. As a result, the bandwidth will not be wasted when the network loading is heavy, and the transmission delay can be shortened when the network loading is low by the prediction of the bandwidth. Next, the predicting bandwidth can be a transmitting bandwidth in the last transmitting cycle for every terminal, which is the data uploading amount in the last transmitting cycle.

Figure 8A:
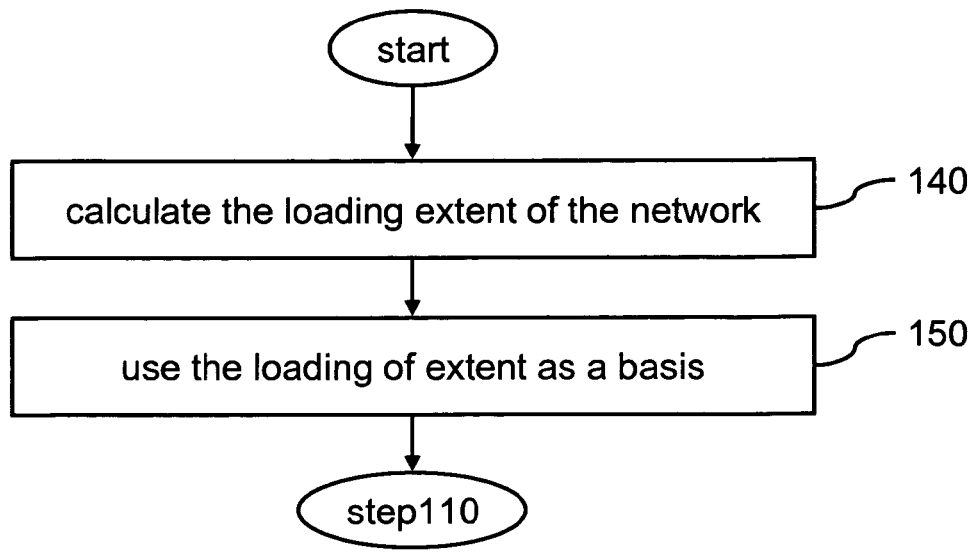
FIG. 8A is a flow chart showing one embodiment of a method for allocating a bandwidth of a network according to the present invention.
Figure 8B:
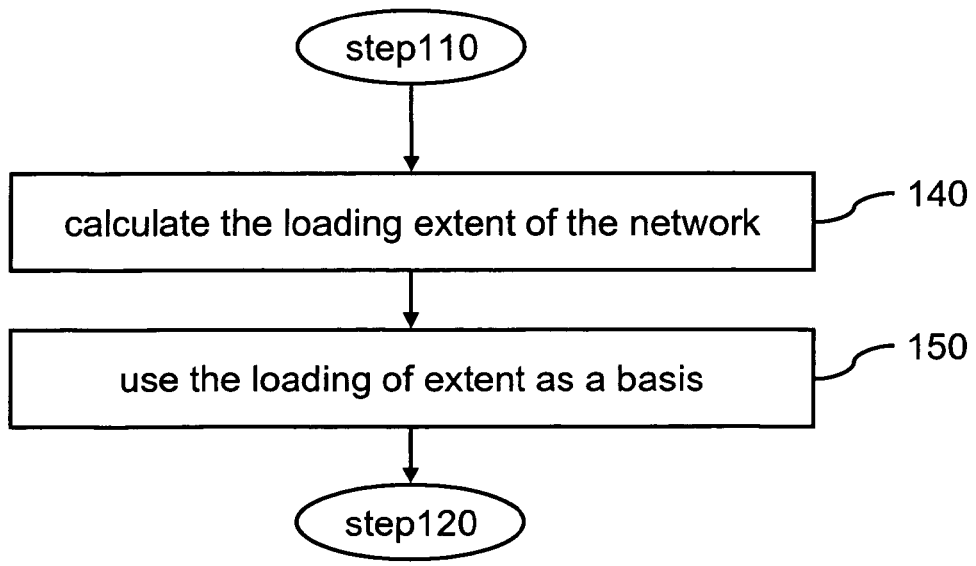
FIG. 8B is a flow chart showing another embodiment of a method for allocating a bandwidth of a network according to the present invention.

In other words, the weight value in step 120 can be obtained by calculating the loading extent of the network (step 140) first and then by using the loading of extent as a basis (step 150). This weight value can be obtained before step 110 or until before step 120, as shown in FIGS. 8A and 8B.

Figure 9A:
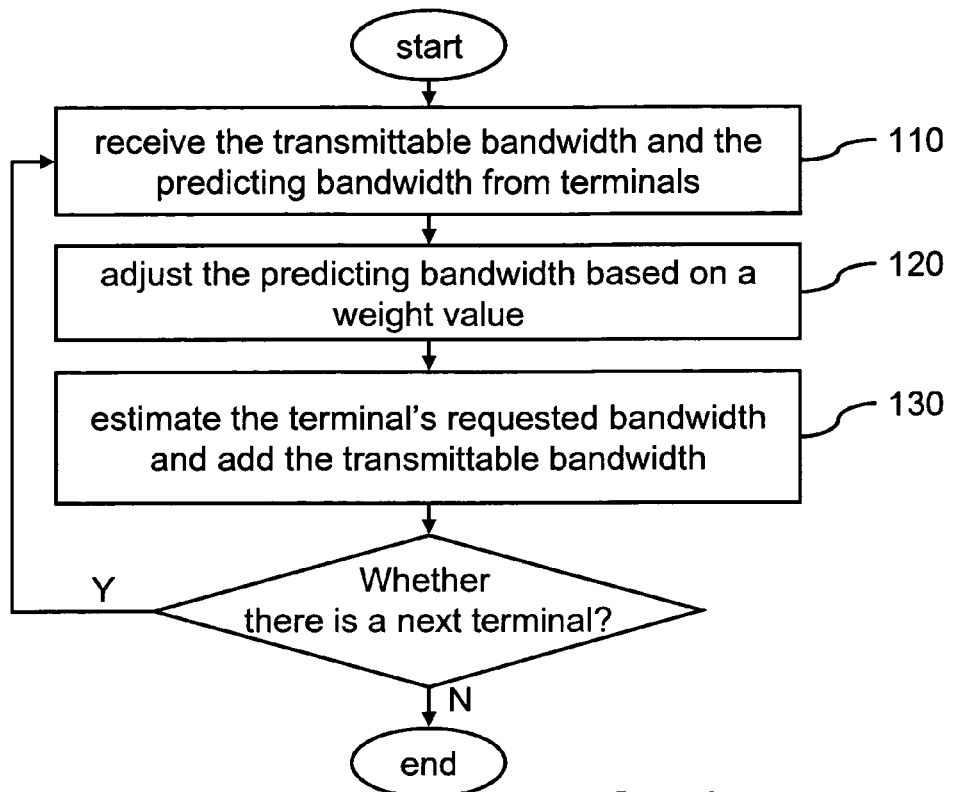
FIG. 9A is a flow chart showing another embodiment of a method for allocating a bandwidth of a network according to the present invention.
Figure 9B:
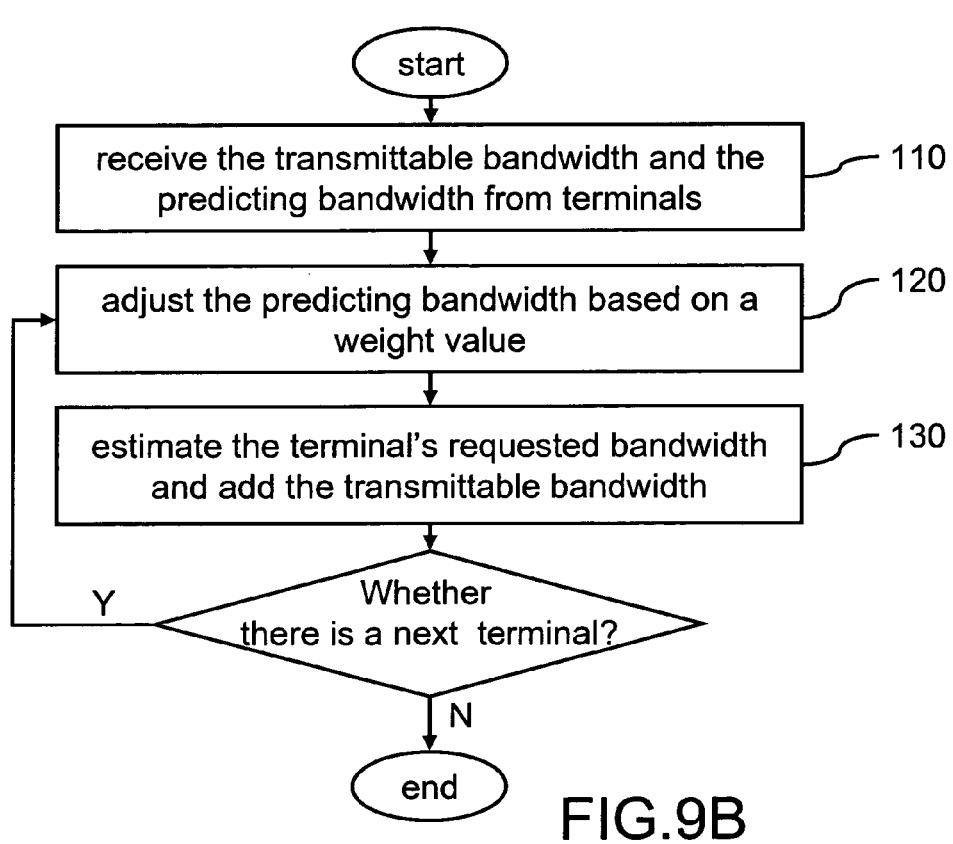
FIG. 9B is a flow chart showing another embodiment of a method for allocating a bandwidth of a network according to the present invention.

Practically, the above steps can be continuously repeated to estimate the requested bandwidth for terminals to which uploading messages are delivered, as shown in FIG. 9A. Or, receive the transmittable bandwidth and the predicting bandwidth for terminals to which uploading messages are delivered first, then followed by continuously repeating steps 120 to 130 to estimate the requested bandwidth for terminals to which uploading messages are delivered, as shown in FIG. 9B.

Figure 10:
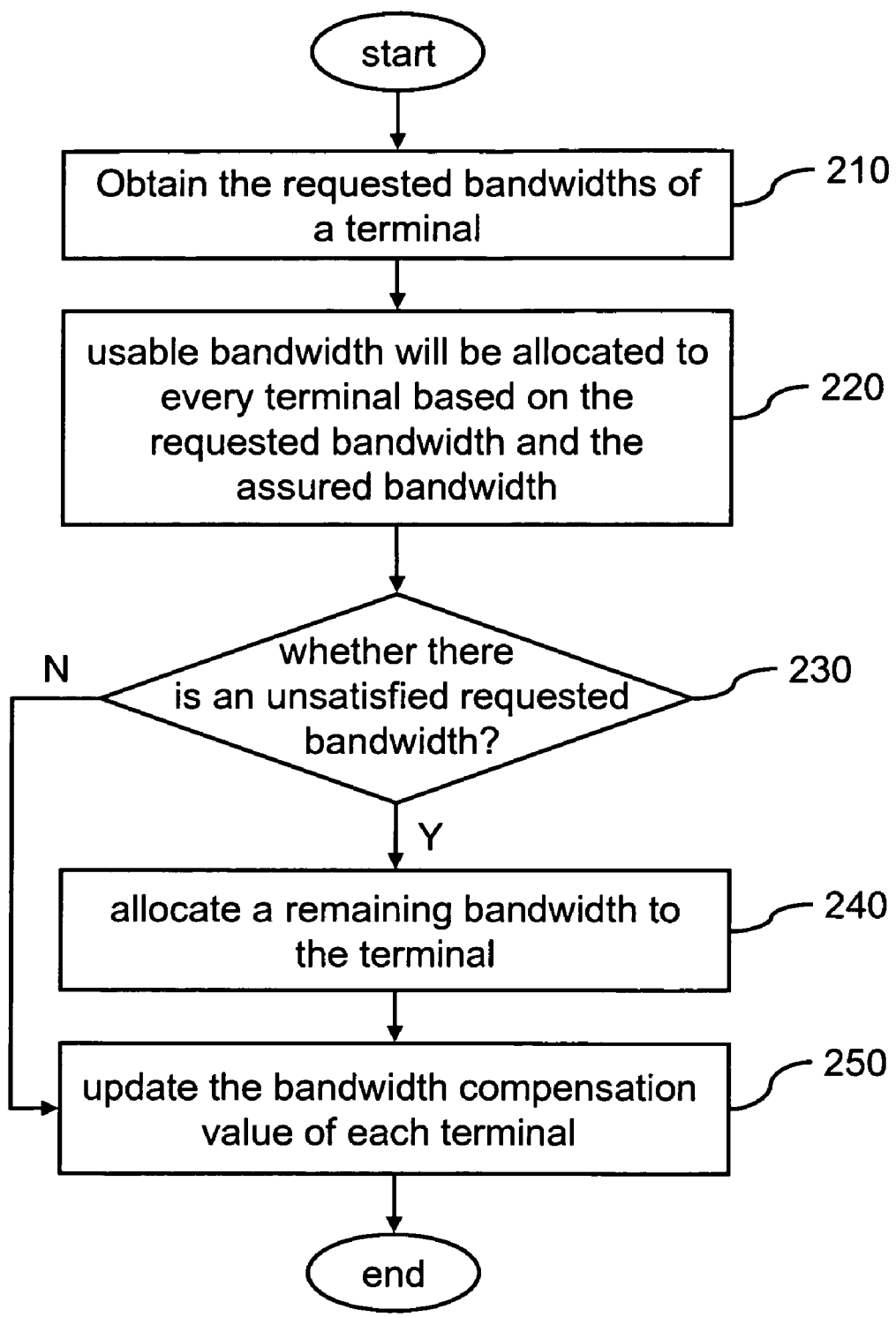
FIG. 10 is a flow chart showing another embodiment of a method for allocating a bandwidth of a network according to the present invention.

Please refer to FIG. 10. Obtain the requested bandwidths of at least one terminal to which uploading messages are delivered (step 210), then calculate the transmitting bandwidth allocated to the terminals requesting bandwidth based on the obtained requested bandwidth. Here, the transmitting bandwidth is the data amount allowable for the corresponding terminal uploading through the network. Every terminal has its useable bandwidth range, and the useable bandwidth range is between an assured bandwidth and a maximum bandwidth.

Figure 11:
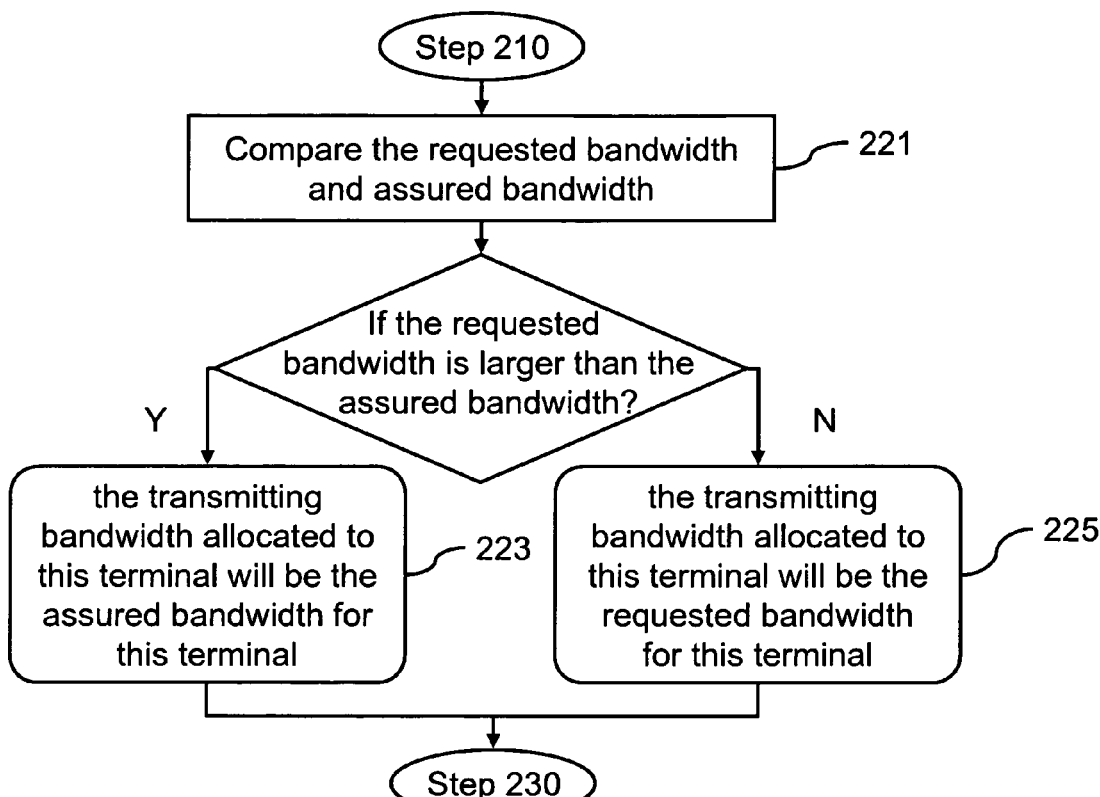
FIG. 11 is a detailed flow chart showing an embodiment of step 220 in FIG. 10.

After obtaining the requested bandwidth, the initial bandwidth allocation will first proceed. This cycle's usable bandwidth will be allocated to every terminal based on the requested bandwidth and the assured bandwidth of each terminal, which means allocating every terminal's transmitting bandwidth one by one (step 220). Compare every terminal's requested bandwidth and assured bandwidth (step 221). The comparison result is the basis for distributing a transmitting bandwidth that conforms either to the requested bandwidth or to the assured bandwidth to the corresponding terminal. If the requested bandwidth is smaller or equal to the assured bandwidth, the transmitting bandwidth allocated to this terminal will be the requested bandwidth for this terminal (step 223). If the requested terminal is larger than the assured bandwidth, the transmitting bandwidth allocated to this terminal will be the assured bandwidth for this terminal (step 225), as shown in FIG. 11. Also, the above steps (the step 221 and the step 223 or the step 221 and the step 225) can be repeated to accomplish the initial allocation of the transmitting bandwidth for every terminal to which uploading messages are delivered.

When the requested bandwidth is larger than the assured bandwidth, an additional excess bandwidth will be allocated to this terminal in addition to the transmitting bandwidth that conforms to the assured bandwidth. Thus, after the initial bandwidth allocation (i.e. step 220), whether there is an unsatisfied requested bandwidth or not will be confirmed one by one (step 230). When there is an unsatisfied requested bandwidth, the remaining bandwidth will be further allocated to the terminal with the unsatisfied bandwidth, meaning an excess bandwidth will be further allocated to every terminal with unsatisfied requested bandwidth to obtain the reallocated transmitting bandwidth of every terminal (step 240), as shown in FIG. 10. In other words, step 230 is to compare the allocated transmitting bandwidth and the requested bandwidth, where if the requested bandwidth is larger than the allocated transmitting bandwidth, an unsatisfied requested bandwidth exists. The remaining bandwidth is the result by the usable bandwidth of the cycle subtracting the allocated transmitting bandwidth (i.e. the remaining bandwidth amount) after the initial bandwidth allocation.

That is, distribute the usable bandwidth of this cycle to every terminal based on the assured bandwidth and the requested bandwidth by the following formula first.

$$\text{B\_grant}_j = \begin{cases} R_j, & \text{if } R_j \leq \text{B\_min}_j \\ \text{B\_min}_j + \text{B\_excess}_j, & \text{if } R_j > \text{B\_min}_j \end{cases} \qquad (7)$$

Formula (7) is the basic method of allocating the transmitting bandwidth, where $R_j$ is the requested bandwidth, $\text{B\_min}_j$ is the assured bandwidth, $\text{B\_excess}_j$ is the excess bandwidth obtained by the reallocation of the remaining bandwidth, and $\text{B\_grant}_j$ is the bandwidth actually allocated to the terminal (i.e. the transmitting bandwidth). In the formula (7), if the requested bandwidth $R_j$ is smaller or equal to the assured bandwidth $\text{B\_min}_j$, this terminal will get the bandwidth it requests (i.e. the requested bandwidth $R_j$); otherwise this terminal will get the assured bandwidth $\text{B\_min}_j$ plus the excess bandwidth $\text{B\_excess}_j$.

Figure 12A:
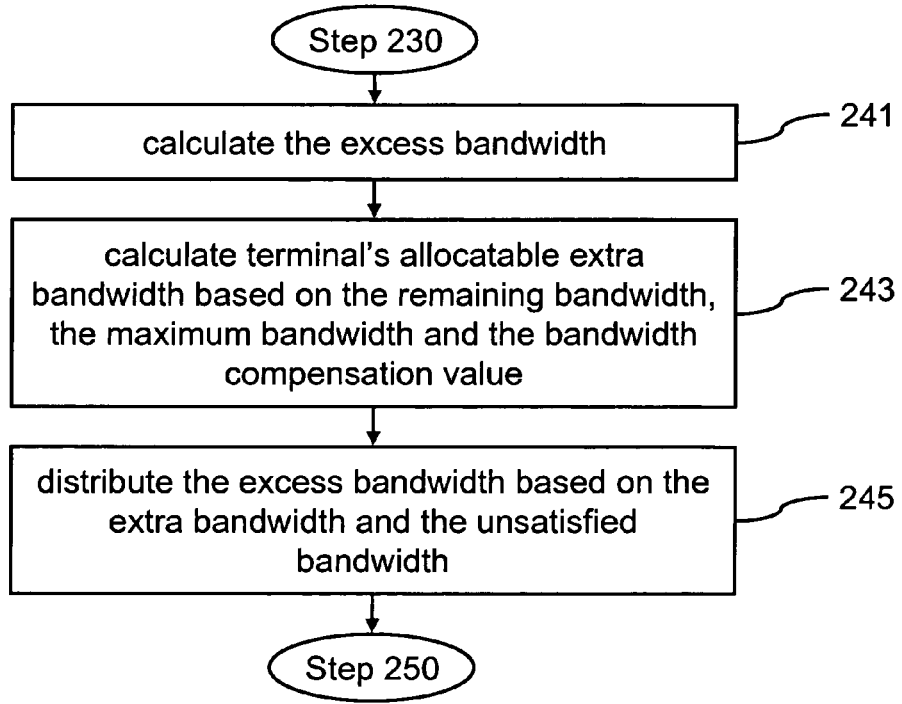
FIG. 12A is a detailed flow chart showing an embodiment of step 240 in FIG. 10.

Compared to the related art, regarding to the calculation of the excess bandwidth, one of the invention's embodiment is to calculate the excess bandwidth based on the maximum bandwidth and the bandwidth compensation value of the terminal with unsatisfied requested bandwidth. Therefore in step 240, the calculation of the excess bandwidth will be based on the usable bandwidth of the network in this cycle and the allocated transmitting bandwidth (step 241). Then calculate every terminal's allocatable extra bandwidth one by one based on the remaining bandwidth, the maximum bandwidth and the bandwidth compensation value of every terminal (with unsatisfied requested bandwidth) (step 243). Finally, further distribute the excess bandwidth one by one based on the extra bandwidth and the unsatisfied bandwidth of every terminal for adjusting the transmitting bandwidth of terminals with unsatisfied requested bandwidth (step 245), as shown in FIG. 12A.

Figure 12B:
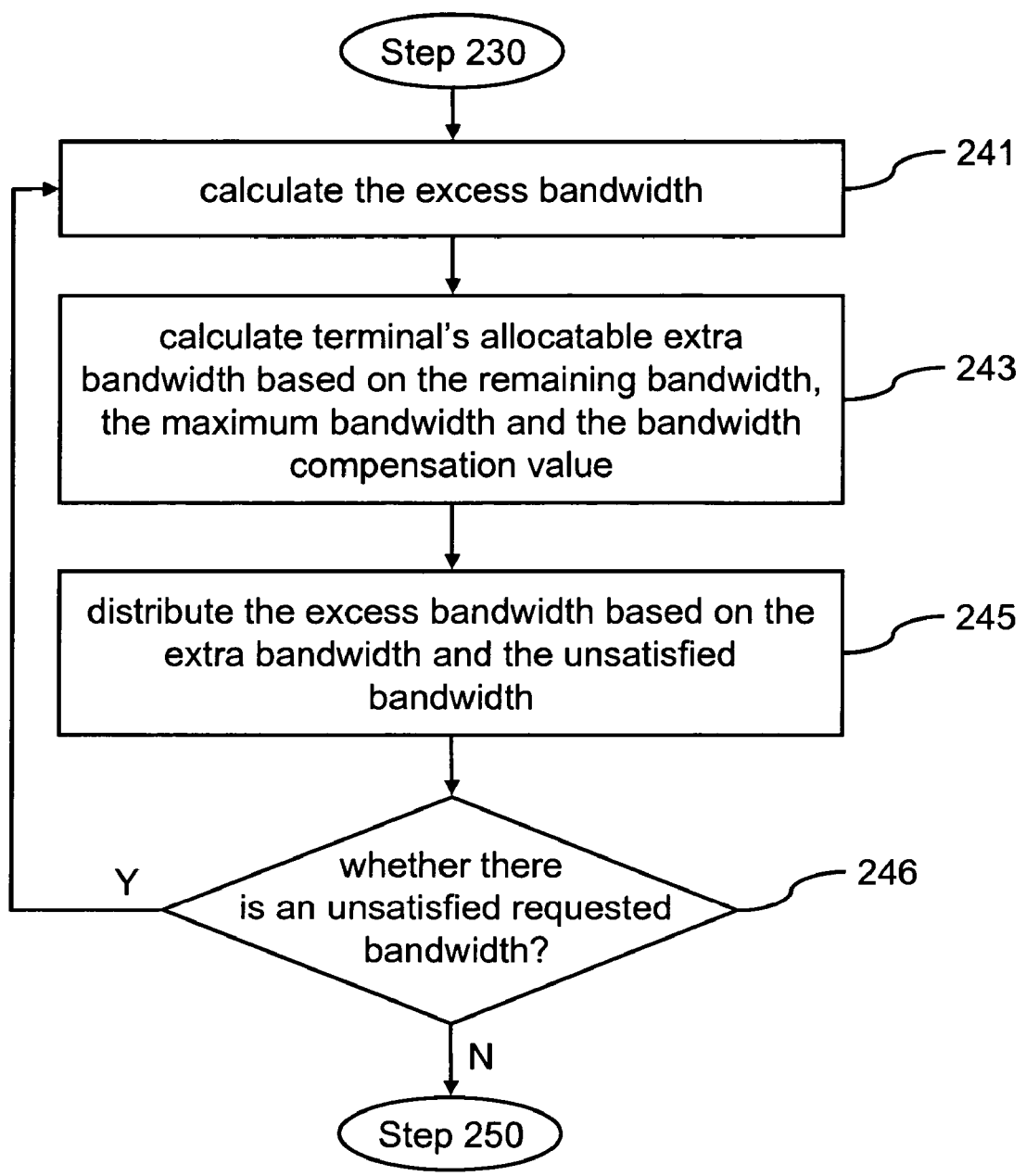
FIG. 12B is a detailed flow chart showing another embodiment of step 240 in FIG. 10.
Figure 12C:
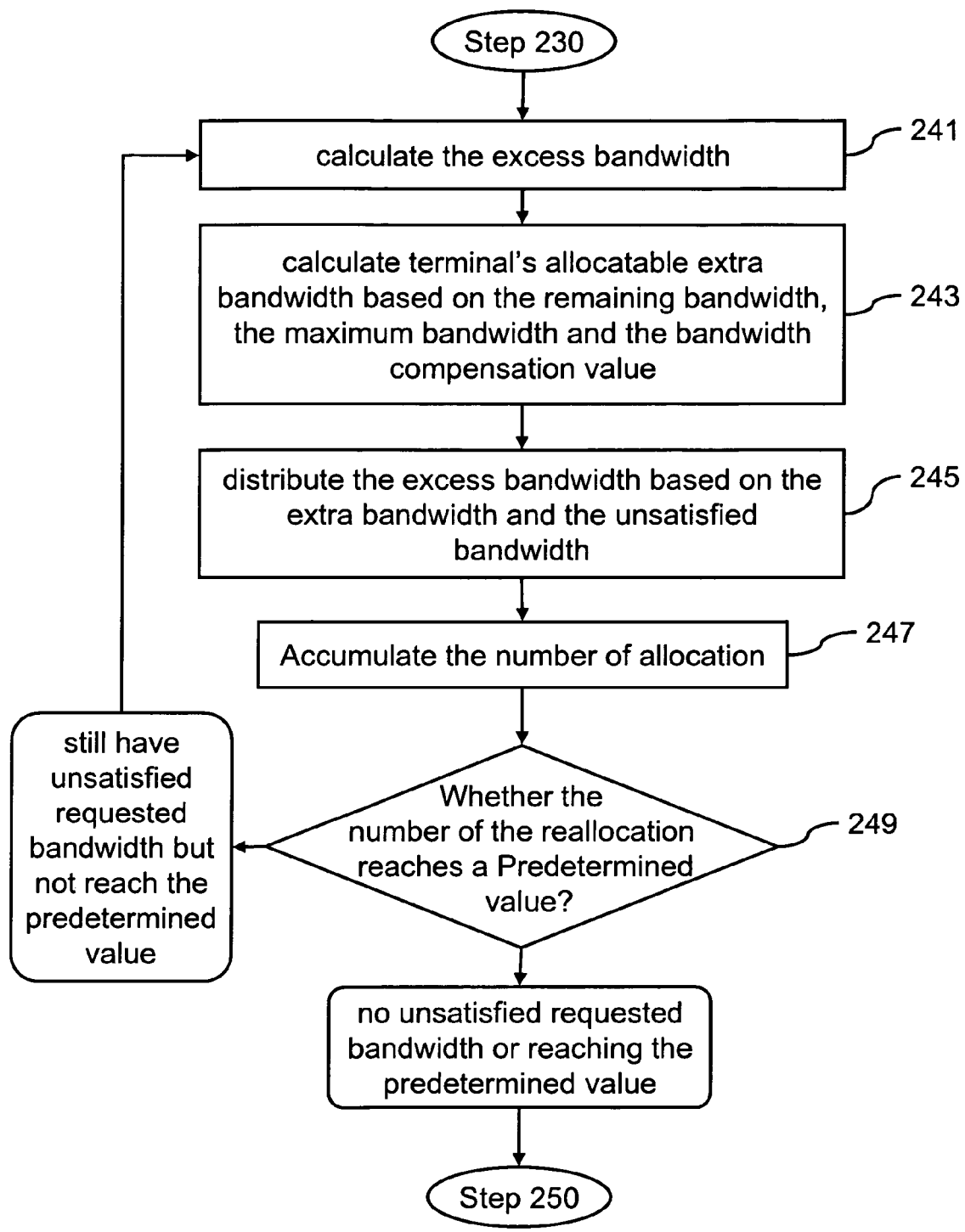
FIG. 12C is a detailed flow chart showing still another embodiment of step 240 in FIG. 10.

The number for the excess bandwidth allocation in the detailed description is only one. However practically, according to the invention, whether there is an unsatisfied requested bandwidth or not will be confirmed after the allocation (step 246). If there is an unsatisfied requested bandwidth, it will perform the excess bandwidth allocation once more by executing the above steps (i.e. the step 241, the step 243 and the step 245) as shown in FIG. 12B. Besides, in order to prevent the number of the excess bandwidth reallocation from being to many, the number of allocation will be accumulated after every time of excess bandwidth allocation (step 247). While whether there is any unsatisfied requested bandwidth or not is confirmed, whether the number of the reallocation reaches a predetermined value or not will also be confirmed (step 249). If there exists an unsatisfied requested bandwidth and the number of the reallocation doesn't reach a predetermined value, step 241, step 243 and step 245 will then proceed to perform the excess bandwidth allocation once more, as shown in FIG. 12C.

Generally, the allocation method for the excess bandwidth is represented by the following formulas.

$$B\_left_n = B\_total_n - \sum_{j=1}^{N} B\_min_j \quad (8)$$

$$B\_extra_k = \frac{B\_max_k - B\_add_k}{\sum (B\_max_k - B\_add_k)} \times B\_left_n, \text{ and } k \in K \quad (9)$$

$$B\_excess_k = \begin{cases} R\_left_k, & \text{if } R\_left_k \leq B\_extra_k \\ B\_extra_k, & \text{if } R_k > B\_extra_k \end{cases}, \text{ and } k \in K \quad (10)$$

Here, formula (8) is for calculating the remaining bandwidth, where $B\_min_j$ is the transmitting bandwidth allocated to the terminal (i.e. the assured bandwidth), B_total is the usable bandwidth of the network in the nth transmitting cycle (n is a positive), B_left is the remaining usable bandwidth in this network at present (i.e. the remaining bandwidth after the initial allocation of the usable bandwidth of the network in this transmitting cycle). According to this formula (8), the remaining bandwidth is the result of the usable bandwidth of the network subtracting the sum of the transmitting bandwidth allocated to every terminal.

Formula (9) is for calculating the extra bandwidth, where $B\_max_k$ is the maximum bandwidth transmittable by the terminal, $B\_add_k$ is the sum of the overspent bandwidth of the terminal cumulated until this transmitting cycle (i.e. the bandwidth compensation value of the terminal), $B\_extra_k$ is the extra bandwidth presently allocatable to the terminal, and K is a class of terminals with unsatisfied requested bandwidth (i.e. when the requested bandwidth $R_j$ is larger than the assured bandwidth $B\_min_j$), where $K=\{R_j>B\_min_j\}$. According to the formula (9), obtain a ratio of remaining bandwidth allocatable to each terminal by the maximum bandwidth $B\_max_k$ and the bandwidth compensation value $B\_add_k$ of every terminal first, then base on the ratio and the remaining bandwidth $B\_left_n$ to calculate the extra bandwidth $B\_extra_k$ allocatable to the terminal. The remaining bandwidth here is obtained by the formula (8). K and k are both positives.

Formula (10) is for allocating the excess bandwidth, where $R\_left_j$ is the remaining requested bandwidth by the requested bandwidth $R_j$ subtracting the allocated transmitting bandwidth (i.e. the assured bandwidth $B\_min_j$), which is $R\_left_j=R_j-B\_min_j$. According to the formula (10), if the remaining requested bandwidth $R\_left_j$ is smaller or equal to the extra bandwidth $B\_extra_j$ obtained from the formula (9), an excess bandwidth $B\_excess_j$ corresponding to the remaining requested bandwidth $R\_left_j$ will be further allocated; otherwise an excess bandwidth $B\_excess_j$ corresponding to the extra bandwidth $B\_extra_j$ will be further allocated. Here, every terminal's maximum bandwidth $B\_max_j$ and assured bandwidth $B\_min_j$ can be determined by the costumer contract.

Figure 13:
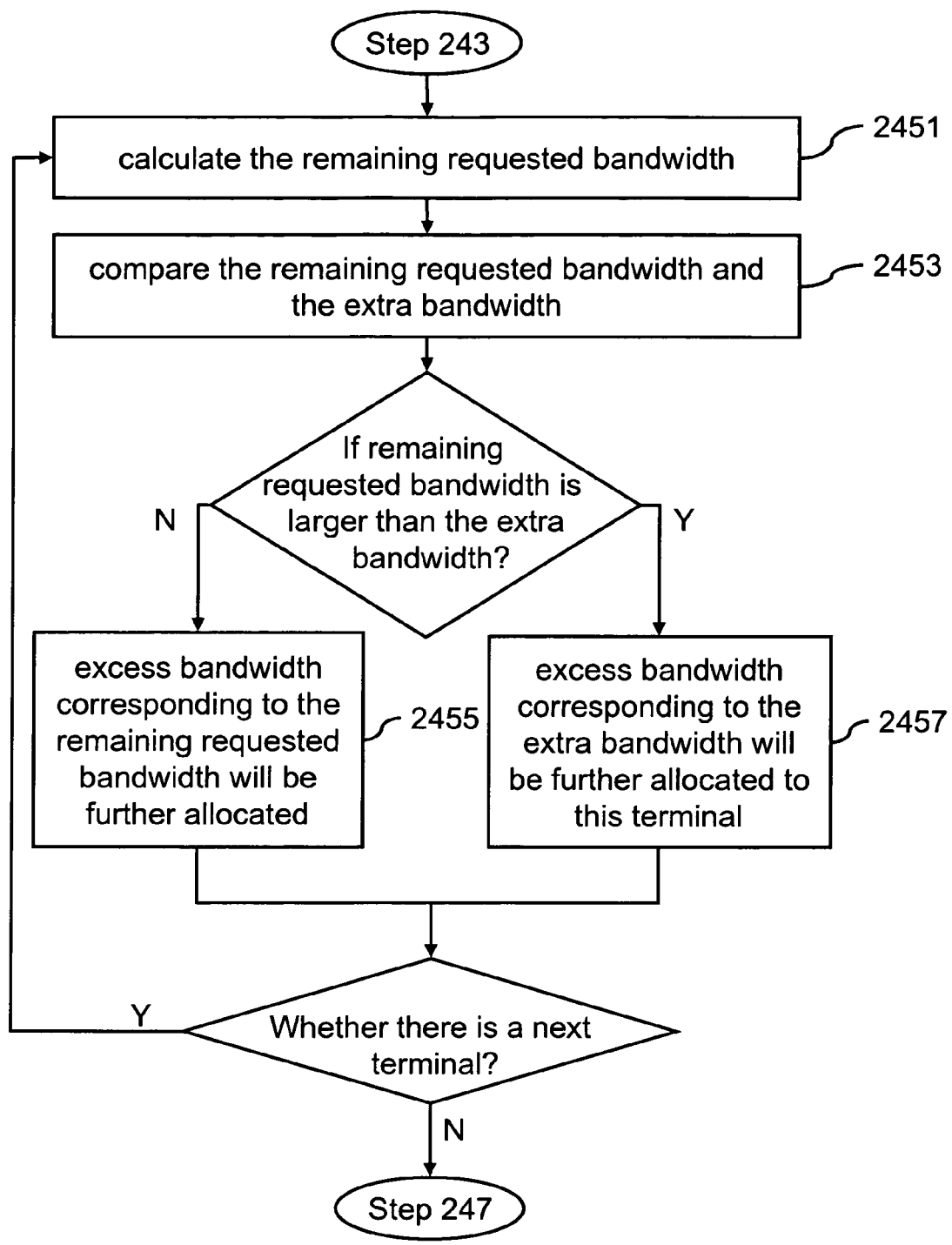
FIG. 13 is a detailed flow chart showing an embodiment of step 245 in FIGS. 12A to 12C.

In step 245 calculate the remaining requested bandwidth based on the requested bandwidth and the allocated transmitting bandwidth first (step 2451), then followed compare the remaining requested bandwidth and the extra bandwidth (step 2453). If the remaining requested bandwidth is smaller or equal to the extra bandwidth, an excess bandwidth corresponding to the remaining requested bandwidth will be further allocated to this terminal (step 2455); otherwise an excess bandwidth corresponding to the extra bandwidth will be further allocated to this terminal (step 2457) as shown in FIG. 13. Also, by repeatedly performing the above steps (i.e. steps 2451, 2453 and 2455 or 2457), the excess bandwidths will be reallocated to all terminals with unsatisfied bandwidth one by one again.

After adjusting the transmitting bandwidth of the terminal with unsatisfied requested bandwidth, every terminal's bandwidth compensation value can be further adjusted based on the maximum bandwidth and the transmitting bandwidth, as shown in FIG. 10.

Figure 14:
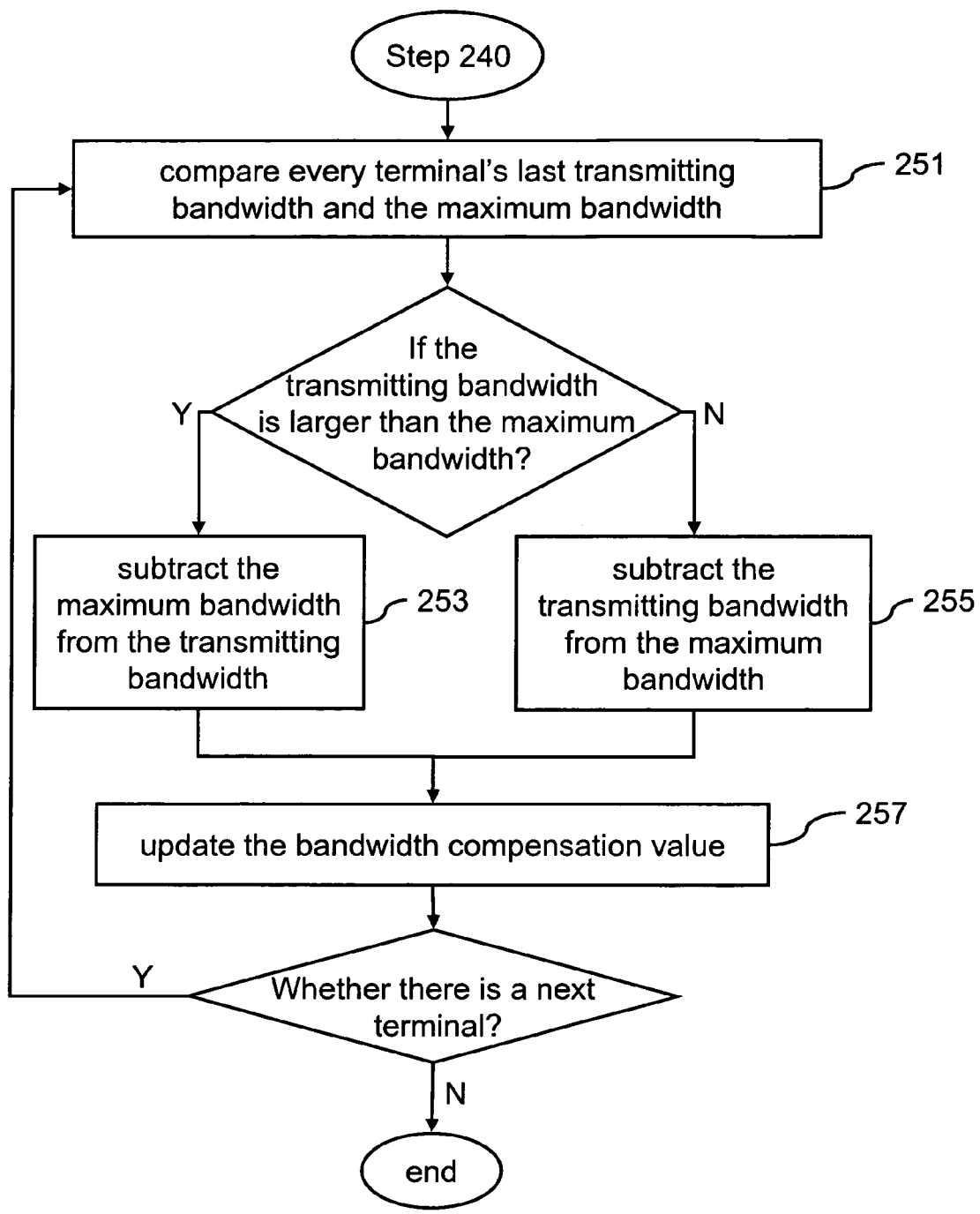
FIG. 14 is a detailed flow chart showing an embodiment of step 250 in FIG. 10.

Step 250 includes updating the bandwidth compensation value according to the overspent extent of the allocated transmitting bandwidth, which means the excess bandwidth will be added to the bandwidth compensation value and the bandwidth which should give but without giving will be subtracted from the bandwidth compensation value in the next transmitting cycle. Please refer to FIG. 14. In step 250, compare every terminal's last transmitting bandwidth and the maximum bandwidth (step 251). When the transmitting bandwidth is larger than the maximum bandwidth, the excess portion, which is the excess bandwidth obtained from the transmitting bandwidth subtracting the maximum bandwidth, will be added to the bandwidth compensation value (step 253) to update the bandwidth compensation value (step 257). On the other hand, if the requested bandwidth is smaller than the maximum bandwidth (i.e. the allocated transmitting bandwidth is smaller than the maximum bandwidth), the allocatable bandwidth (i.e. the un-used bandwidth obtained from the maximum bandwidth subtracting the transmitting bandwidth) or the allocated remaining requested bandwidth (i.e. the un-used bandwidth obtained from the requested bandwidth subtracting the transmitting bandwidth) will be subtracted from the bandwidth compensation value (step 255) to update the bandwidth compensation value (step 257). Similarly, every terminal's bandwidth compensation value can be updated one by one by repeatedly performing the above steps (i.e. steps 251, 253 and 257, or 253 and 257).

Figure 15A:
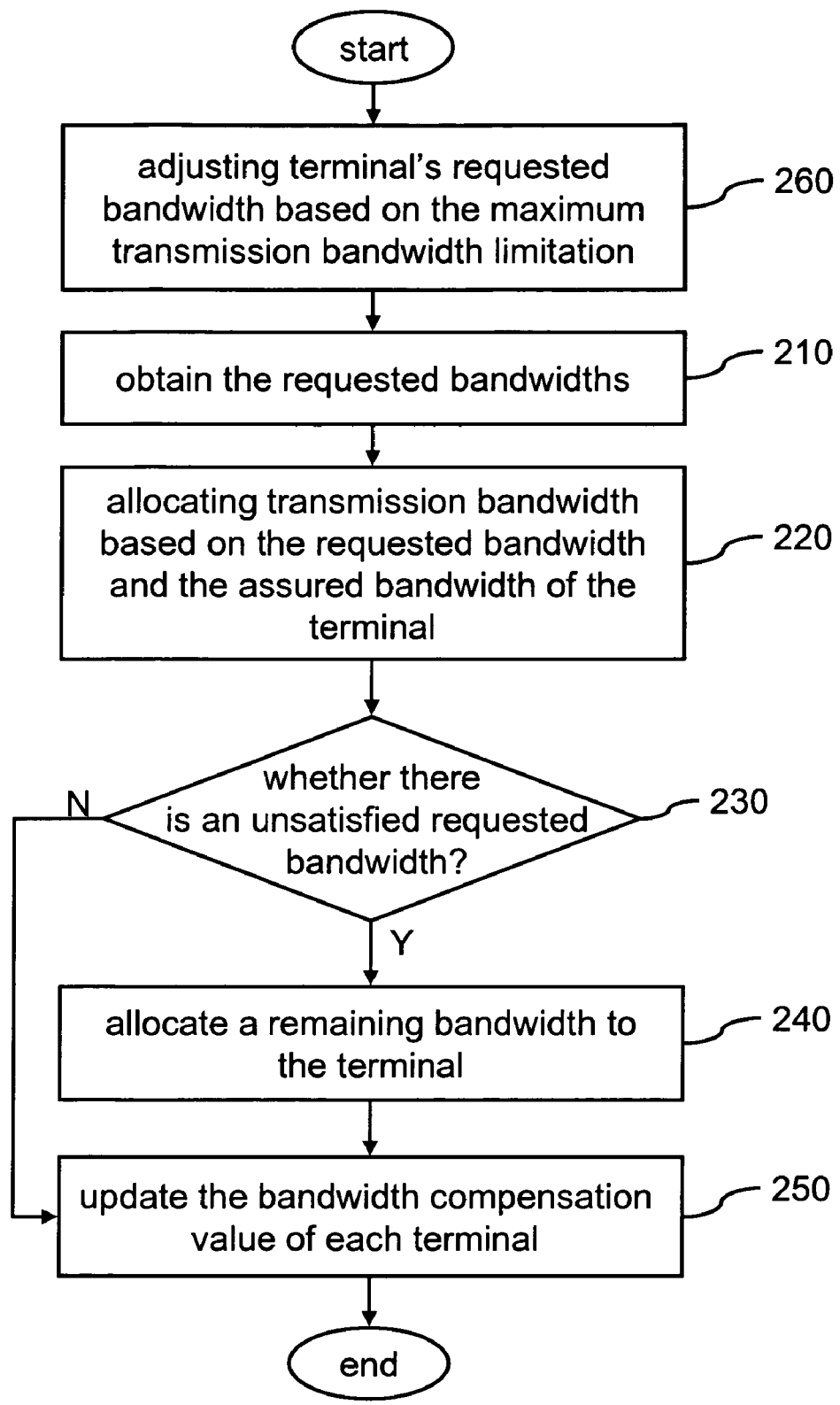
FIG. 15A is a flow chart showing another embodiment of a method for allocating a bandwidth of a network according to the present invention.
Figure 15B:
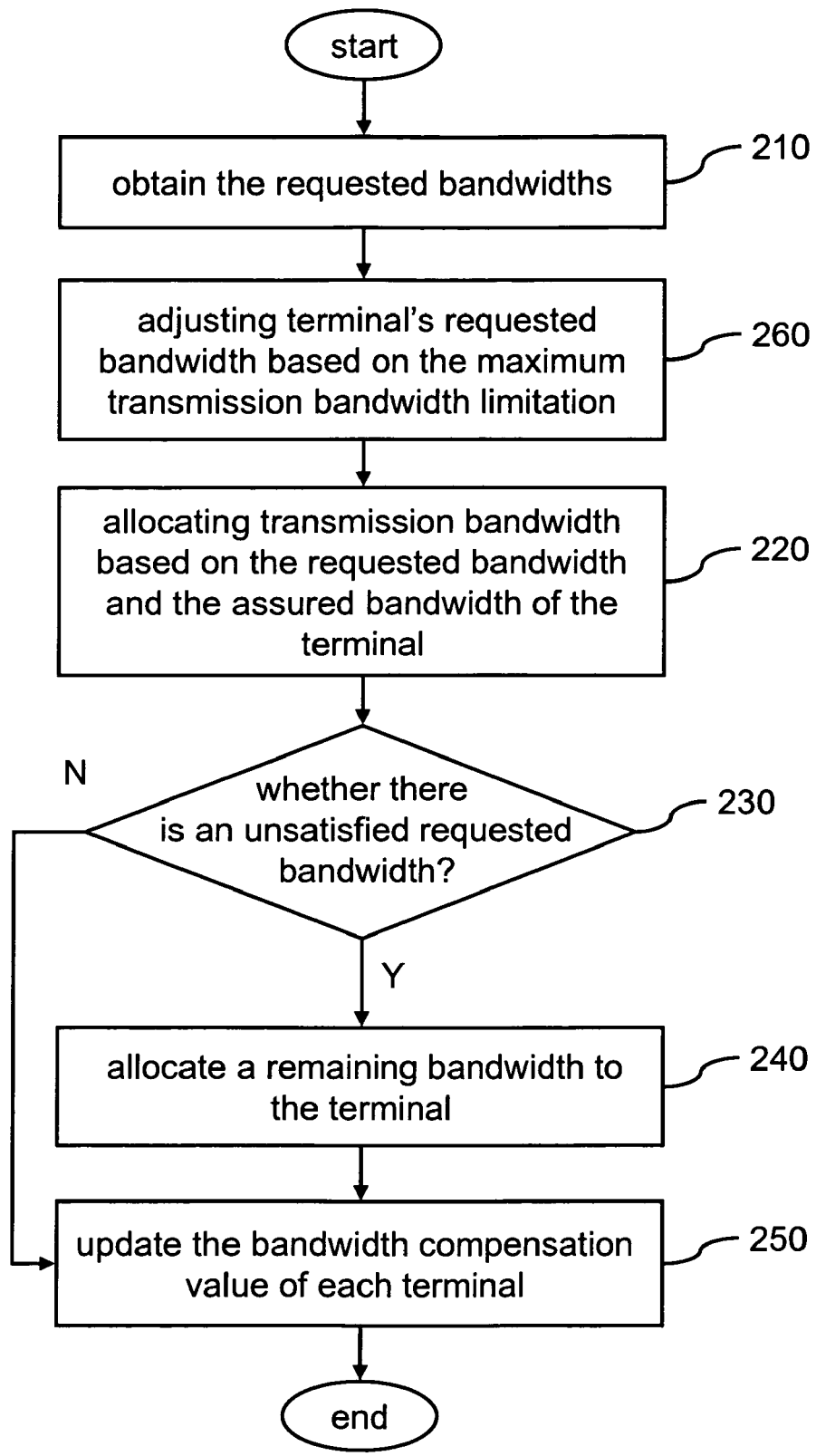
FIG. 15B is a flow chart showing another embodiment of a method for allocating a bandwidth of a network according to the present invention.

In order to prevent transmission delay from jiggering over, a maximum transmission bandwidth limitation will be previously set up, which means every terminal has one maximum transmission bandwidth limitation in one transmitting cycle. Therefore, before or after the initial bandwidth allocation (i.e. step 220), every terminal's requested bandwidth can be previously adjusted based on the maximum transmission bandwidth limitation for the terminal (step 260), as shown in FIGS. 15A and 15B.

Figure 16A:
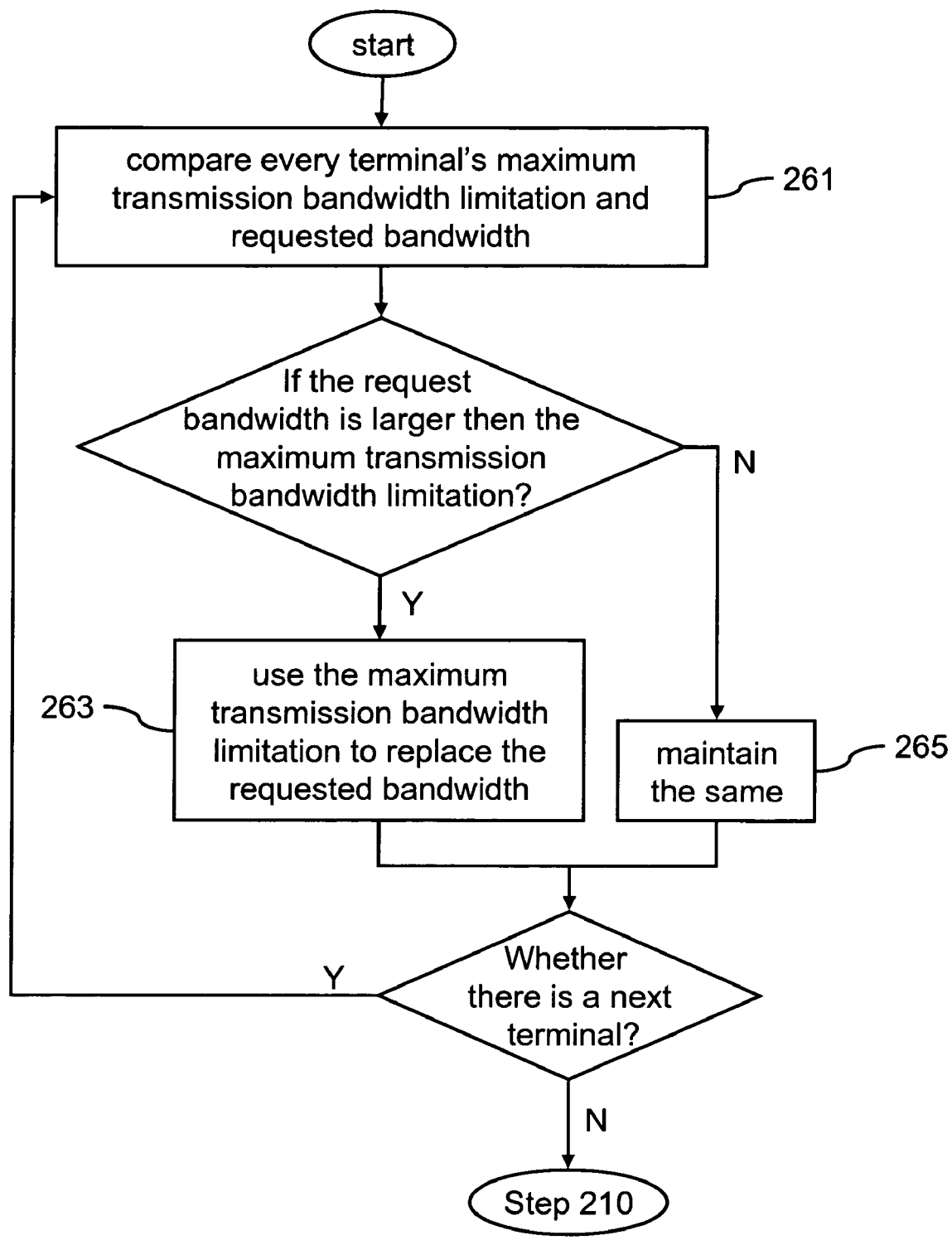
FIG. 16A is a detailed flow chart showing one embodiment of step 260 in FIG. 15A.
Figure 16B:
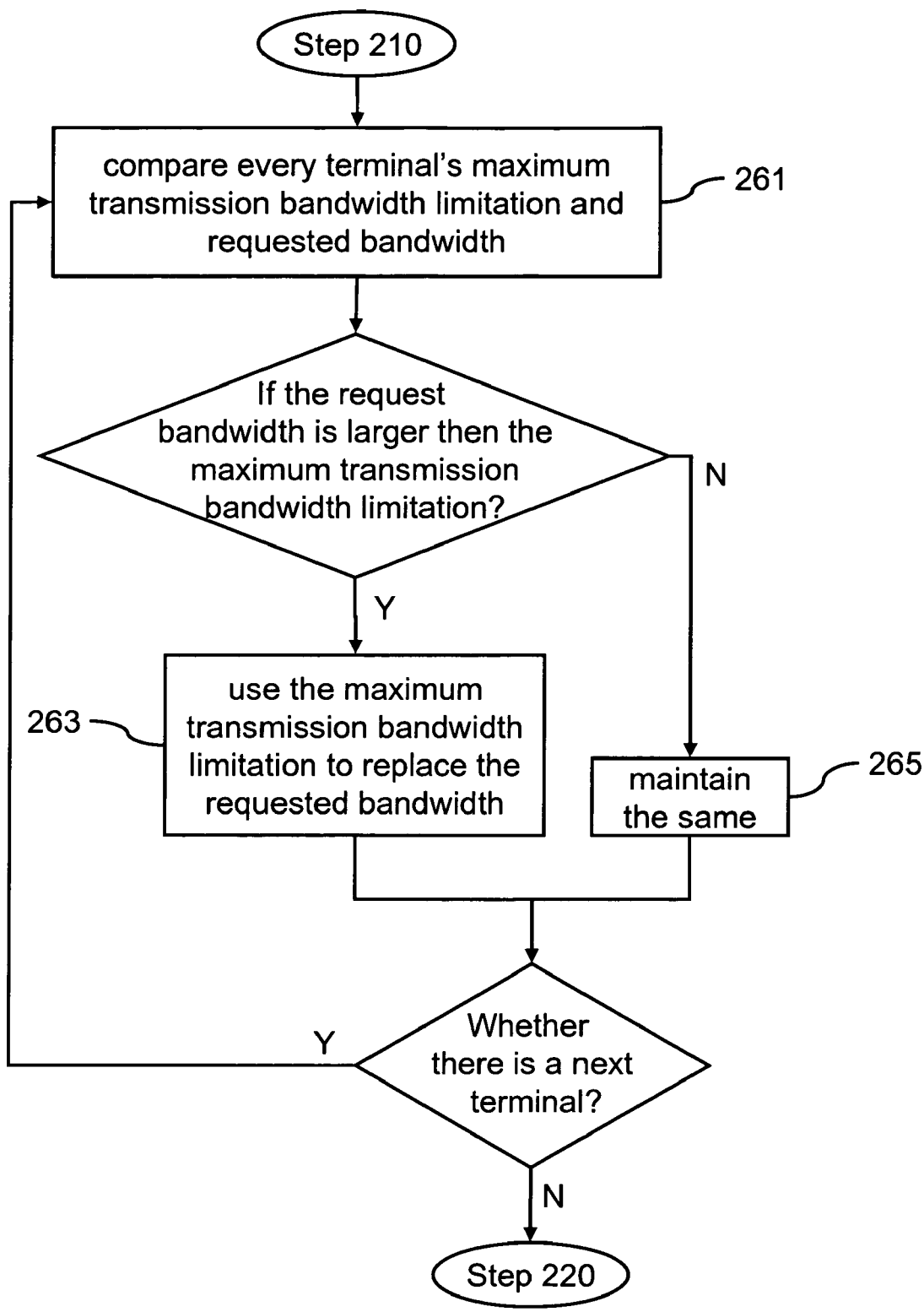
FIG. 16B is a detailed flow chart showing another embodiment of step 260 in FIG. 15B.

Please refer to FIGS. 16A and 16B. The adjusting method in step 260 is to compare every terminal's maximum transmission bandwidth limitation and requested bandwidth one by one (step 261), and use the maximum transmission bandwidth limitation to replace the requested bandwidth being used in the following procedures when the requested bandwidth is larger than the maximum transmission bandwidth limitation (step 263). Otherwise, the original requested bandwidth will be sustained (i.e. doesn't use the maximum transmission bandwidth limitation to replace the requested bandwidth) (step 265). They are represented in the following formulas.

$$R'_j = \begin{cases} R_j, & \text{if } R_j \leq B\_bound_j \\ B\_bound_j, & \text{if } R_j > B\_bound_j \end{cases} \quad (11)$$

In the formula (11), $R'_j$ is the modified requested bandwidth, $R_j$ is the original requested bandwidth, and $B\_bound_j$ is the maximum transmission bandwidth limitation of the terminal. Here, the maximum transmission bandwidth limitation can be a bandwidth between the maximum bandwidth and the twice the maximum bandwidth.

According to the description above, in the transmitting bandwidth allocation method according to the invention, when a terminal requesting a bandwidth smaller or equal to the assured bandwidth, the bandwidth requested will be given. However if the bandwidth requested is larger than the assured bandwidth, the remaining bandwidth of the network will be first calculated after all the terminals have their assured bandwidth (or requested bandwidth), which will be further allocated based on a ratio of a value obtained from the maximum bandwidth of the terminal which has not finished the allocation subtracting the overspent bandwidth (i.e. bandwidth compensation value). In other words, the larger the maximum bandwidth the terminal has, the more bandwidth the terminal can get. The more overspent extent the terminal has, the less bandwidth the terminal can get. Because the maximum bandwidth is mostly set up based on the costumer contract, this method can accomplish the purpose of determining the remaining bandwidth allocation based on how important the client is and the excess use extent of the bandwidth so that the usable bandwidth of the network can be more fairly to be allocated to every terminal. Due to the set up of the maximum transmitting bandwidth limitation, the overspent bandwidth (i.e. bandwidth compensation value) will be limited in the maximum bandwidth. Therefore when the maximum bandwidth minus the cumulated overspent bandwidth (i.e. the bandwidth compensation value) is zero, this terminal will not be able to be included in the allocation of the remaining bandwidth so that a costumer's usable transmitting bandwidth can be effectively restricted, improved the fairness of the bandwidth allocation.

Figure 17:
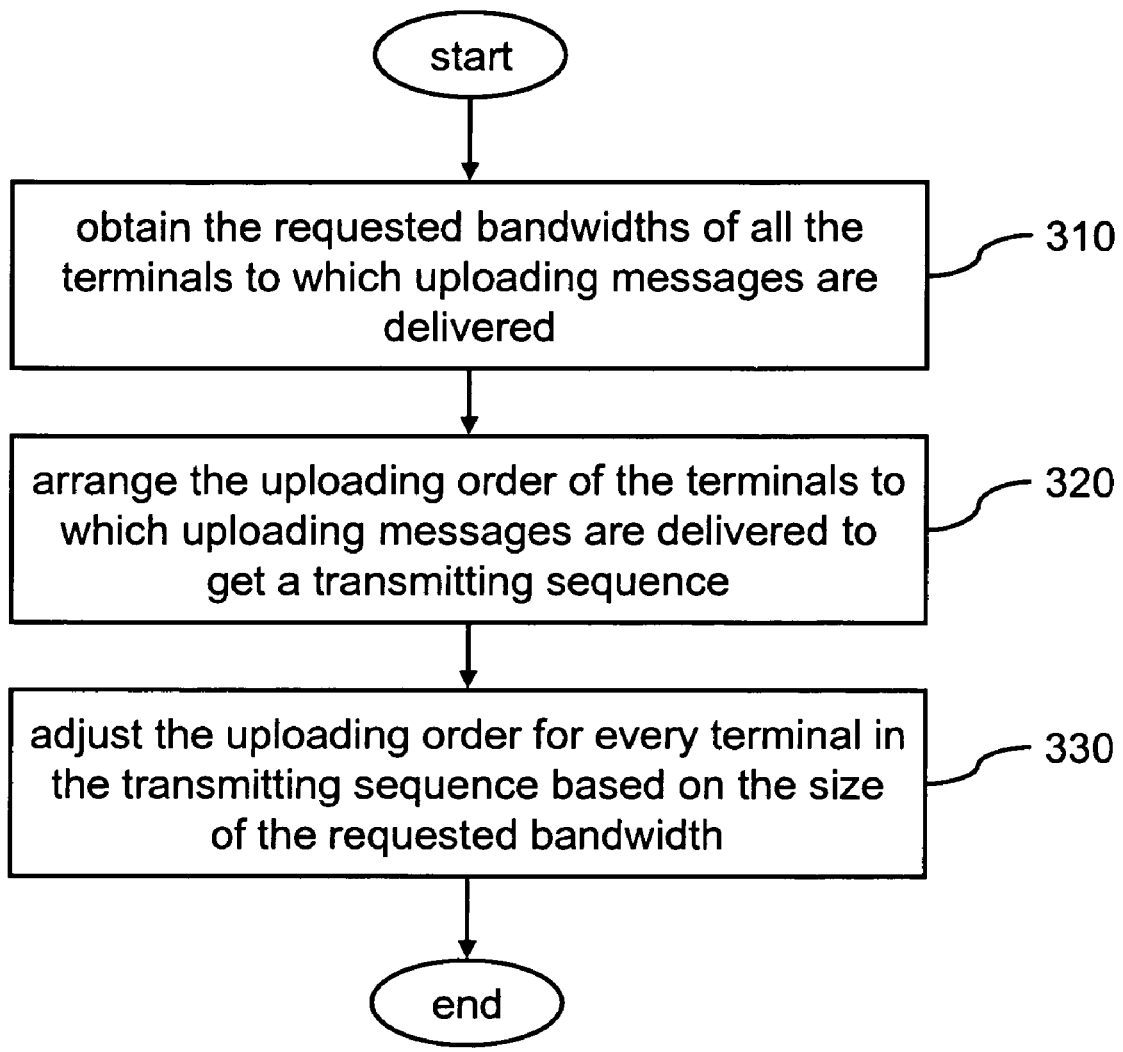
FIG. 17 is a flow chart showing another embodiment of a method for allocating a bandwidth of a network according to the present invention.

Next, focus on using the uploading order to improve the network transmitting bandwidth allocation, which adjusts the transmitting sequence mainly based on the data uploading amount of the terminal. This transmitting sequence is an order that the office terminal depends on to determine which uploading requested terminal to upload the data. Here, every terminal will deliver an uploading message to inform the office terminal before uploading the data to the office terminal through the network, where this uploading message includes a requested bandwidth to inform the office terminal the amount of the prepared uploading data. Please refer to FIG. 17. The office terminal will then obtain the requested bandwidths of all the terminals to which uploading messages are delivered (step 310). Next, arrange the uploading order of the terminals to which uploading messages are delivered to get a transmitting sequence (step 320). Sequentially adjust the uploading order for every terminal in the transmitting sequence based on the size of the requested bandwidth (step 330), where the office terminal can then determine which terminal to upload data one by one.

Figure 18A:
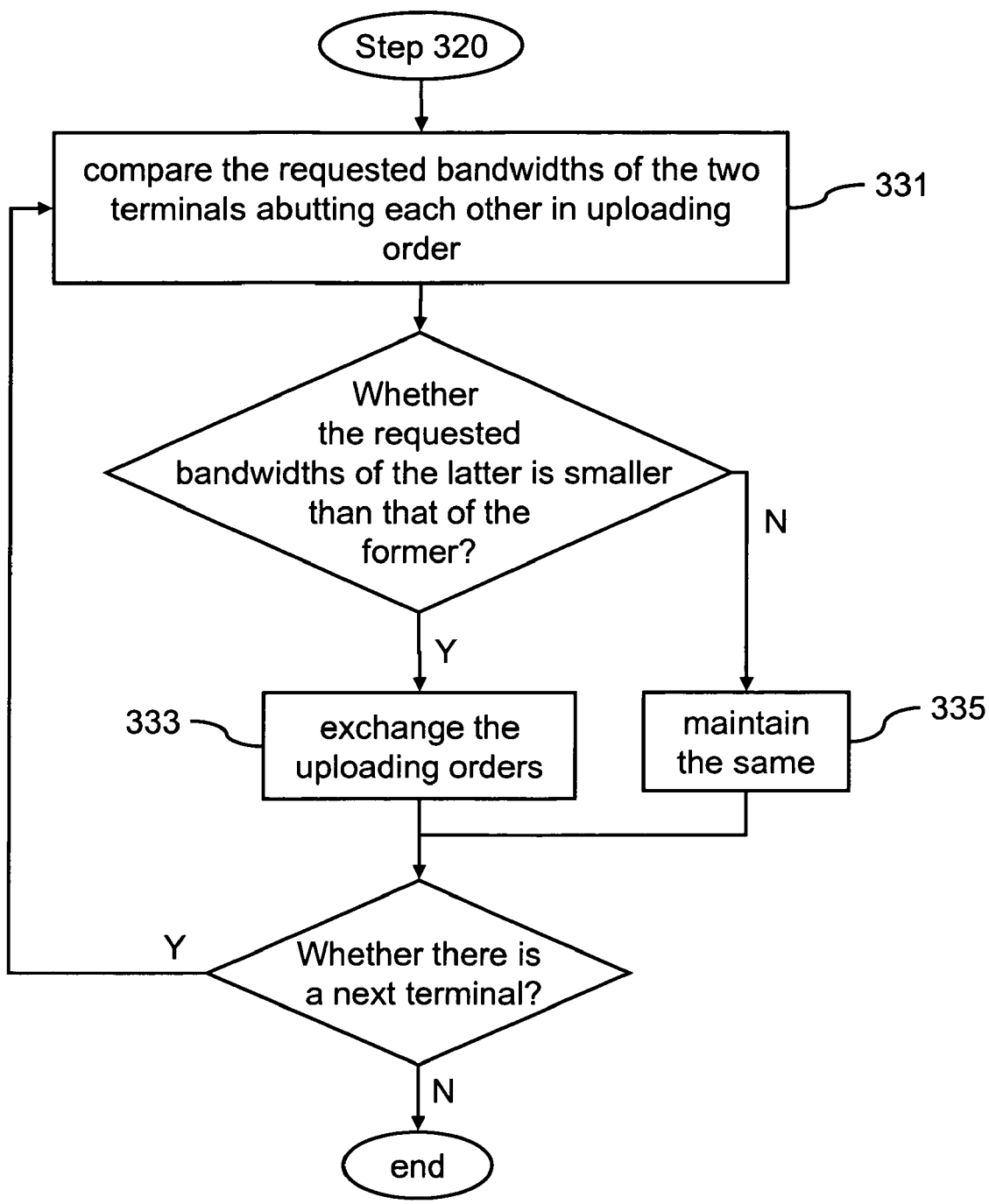
FIG. 18A is a detailed flow chart showing one embodiment of step 330 in FIG. 17.

The adjusting method in step 330 is to compare the requested bandwidths of the two terminals abutting each other in uploading order (step 331). If the requested bandwidth of a terminal with a lower uploading order is smaller than that of a terminal with a higher uploading order, the uploading orders of these two terminals will exchange (step 333). Otherwise the original uploading sequence will maintain the same (step 335) to get the modified transmitting sequence as shown in FIG. 18A. The above steps will repeat until all the terminals' uploading orders are adjusted.

Figure 18B:
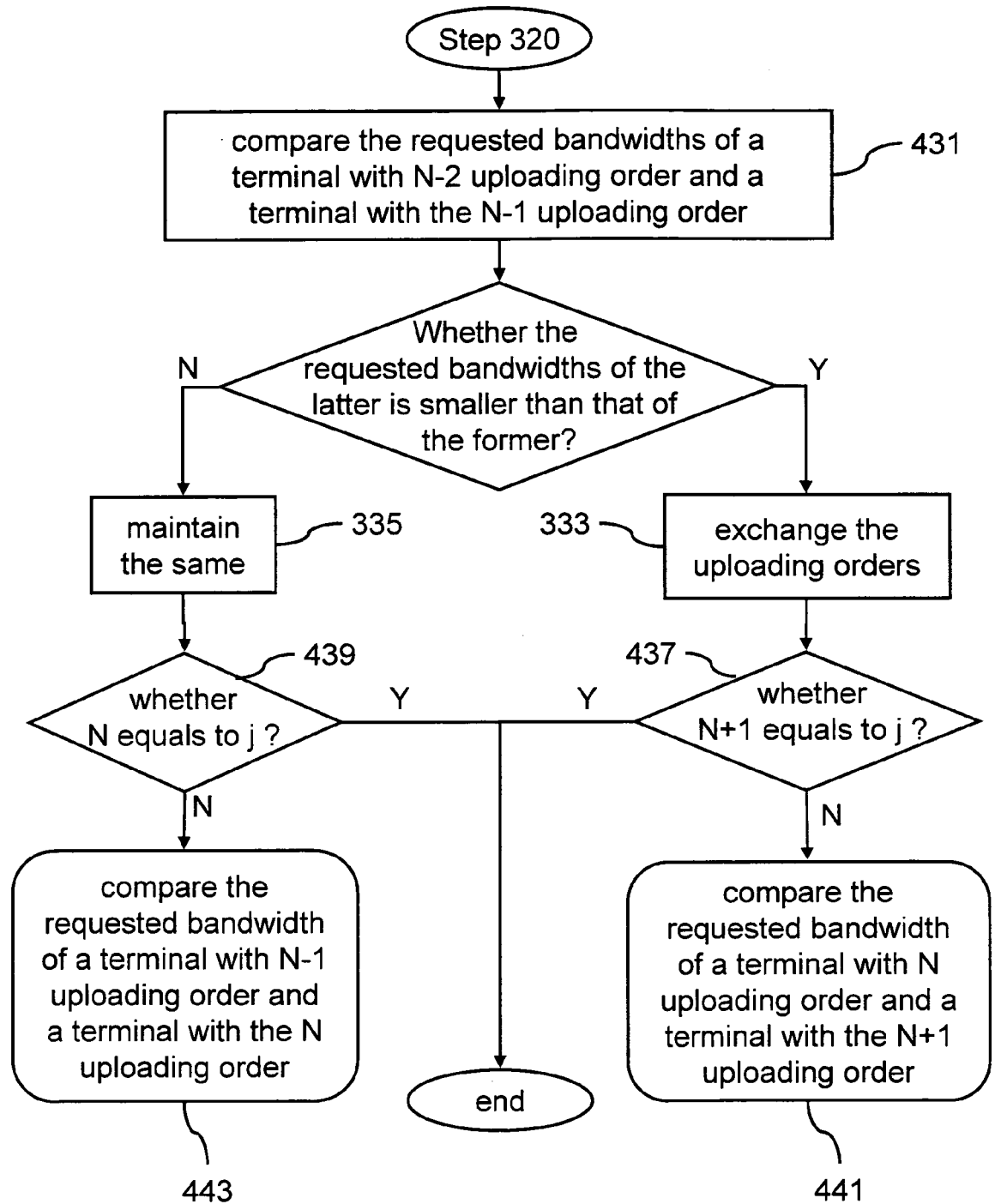
FIG. 18B is a detailed flow chart showing another embodiment of step 330 in FIG. 17.

For example, an embodiment is shown in FIG. 18B. Presume that there are j pieces of terminals to which uploading messages are delivered (i.e. the last uploading order is j). When comparing the requested bandwidths of a terminal with N−2 uploading order and a terminal with the N−1 uploading order (step 431) (where N≦j), and the requested bandwidth of the terminal with N−1 uploading order is smaller than that of the terminal with the N−2 uploading order, these two terminal's uploading order will switch (step 333). The uploading order of the terminal with the N−2 uploading order will change to the N−1 uploading order and the uploading order of the terminal with the N−1 uploading order will change to the N−2 uploading order. On the other hand, if the requested bandwidth of the terminal with N−1 uploading order is not smaller than that of the terminal with the N−2 uploading order, these two terminal's uploading order will not switch (step 335). Next, when the order has been switched, make sure whether the N+1 uploading order is the last uploading order or not (i.e. make sure whether N+1 equals to j or not) (step 437). If the N+1 uploading order is not the last uploading order (i.e. N+1≠j), continue to compare the requested bandwidth of a terminal with N uploading order and a terminal with the N+1 uploading order (step 441); otherwise (i.e. N+1=j), don't continue. If there is no switch between two orders, make sure whether the N uploading order is the last uploading order or not (i.e. make sure whether N equals to j or not) (step 439). If the N uploading order is not the last uploading order (i.e. N≠j), continuously compare the requested bandwidth of a terminal with N−1 uploading order and a terminal with the N uploading order (step 443); otherwise (i.e. N=j), don't continue.

Figure 18C:
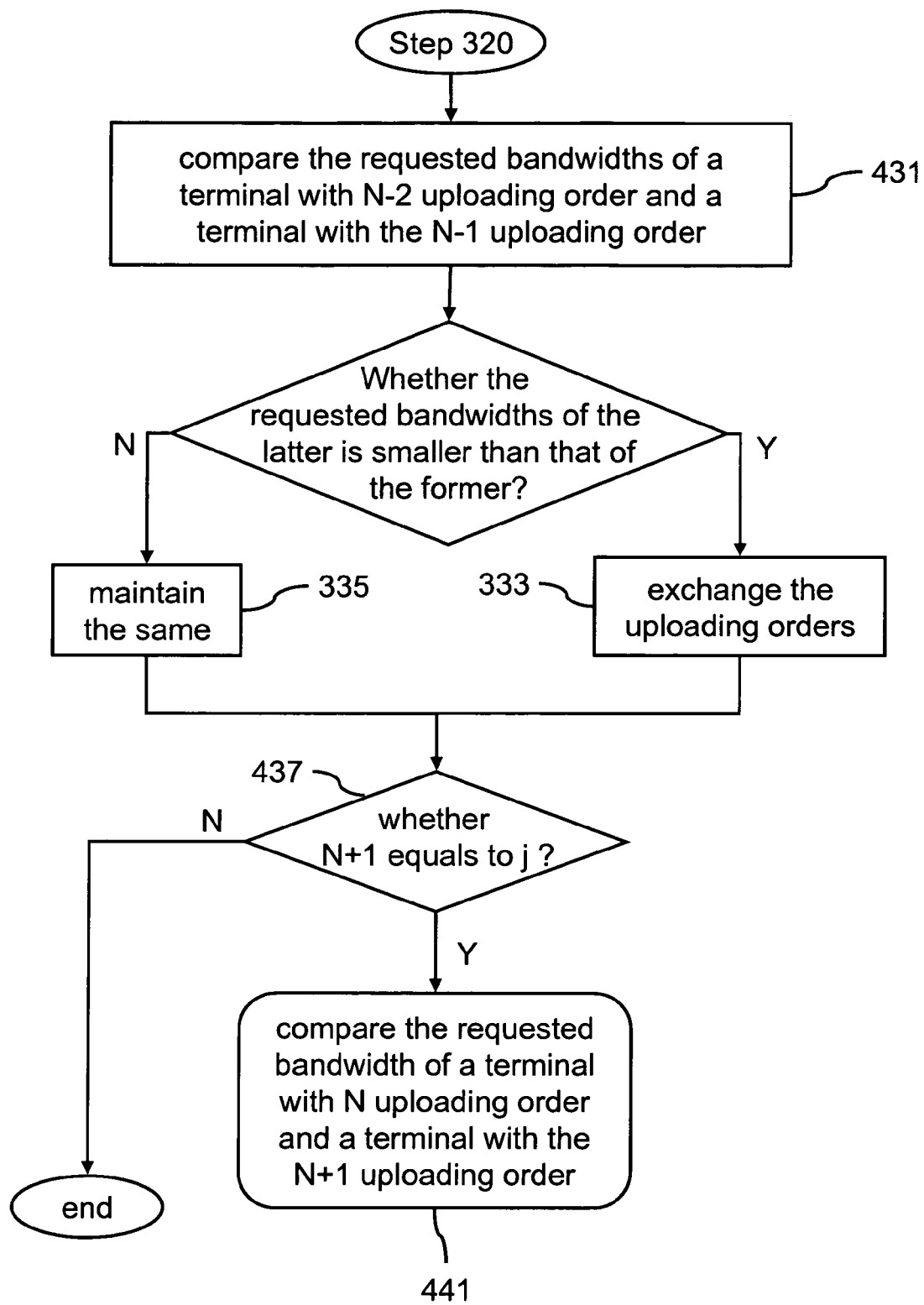
FIG. 18C is a detailed flow chart showing still another embodiment of step 330 in FIG. 17.

The step of confirming whether the N+1 uploading order is the last uploading order or not also (i.e. confirm whether N+1 equals j or not) can be performed after step 333 or step 335 (step 437). If the N+1 uploading order is not the last uploading order (i.e. N+1≠j), continue to compare the requested bandwidth of a terminal with N uploading order and a terminal with the N+1 uploading order (step 439); otherwise (i.e. N+1=j), don't continue, as shown in FIG. 18C.

Figure 19:
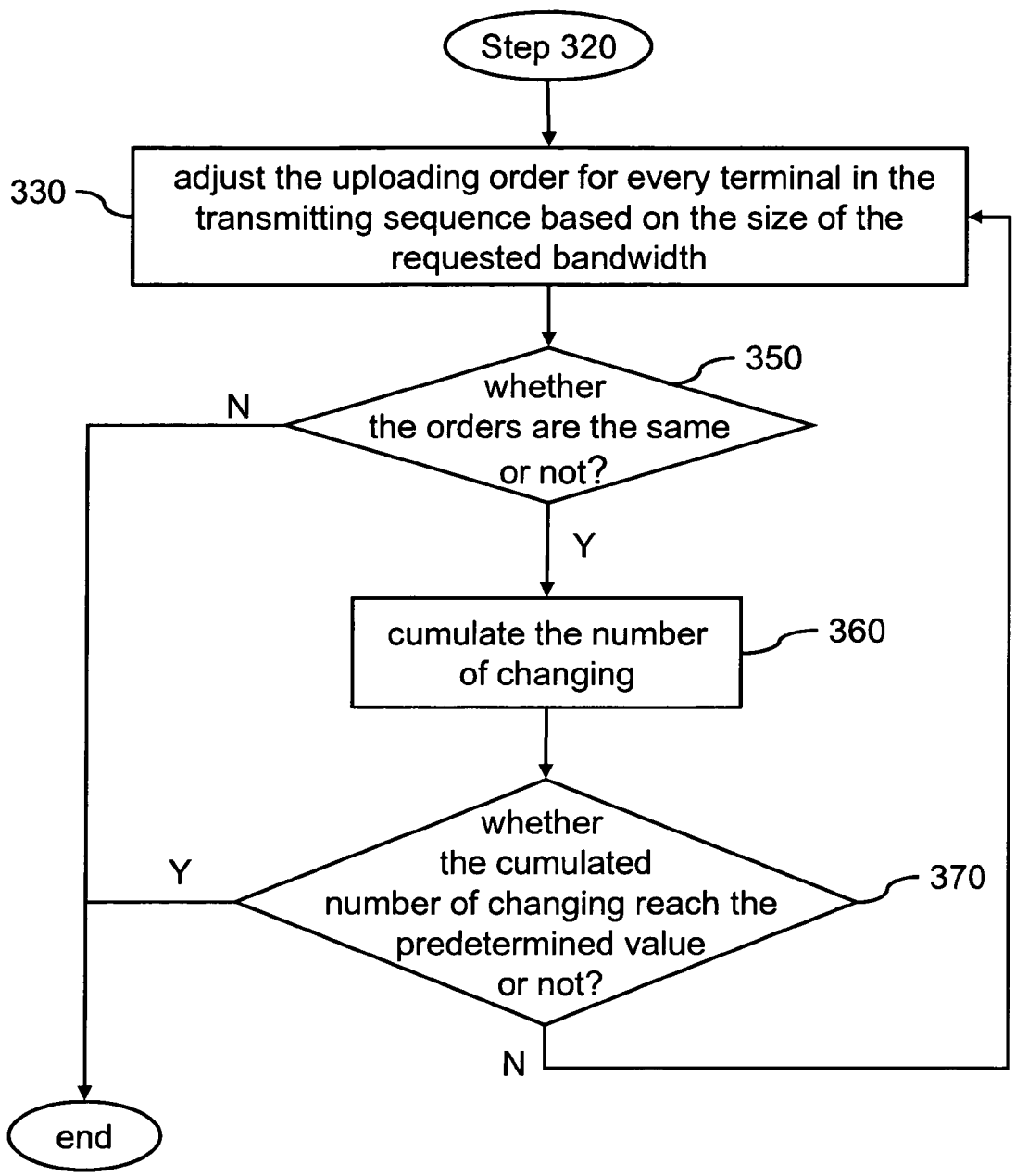
FIG. 19 is a flow chart showing still another embodiment of a method for allocating a bandwidth of a network according to the present invention.

Only one modification of the transmitting sequence is described. However, according to the embodiment of the invention, the step 330 can be repeatedly performed to make every terminal's uploading order changed and become a better sequence by the proposed uploading data amount. However, in order to prevent the uploading order of each terminal from changing too much, a predetermined value can be set up previously. Also, after a modified transmitting order is received (i.e. step 330), make sure whether the modified transmitting order and the original transmitting order are the same or not (step 350). If they are not the same, cumulate the number of changing (step 360), and confirm whether the cumulated number of changing reach the predetermined value or not (step 370). If the cumulated number of changing does not reach the predetermined value, go back to the step 330 to adjust the transmitting sequence based on the requested bandwidth again. On the other hand, if the cumulated number of changing does reach the predetermined value, stop adjusting the transmitting sequence. The office terminal will then use the last adjusted transmitting sequence to determine which terminal should upload data, as shown in FIG. 19.

In summary, compared to the related art, the invention provides a method for allocating bandwidth of a network which is capable of adjusting the transmitting sequence based on the uploading data amount of the terminal. The invention further provides a method for allocating bandwidth of a network which is capable of adjusting the predicting bandwidth allocation ratio based on the loading extent of the network for effectively reducing the average transmission delay. According to the invention, the bandwidth efficiency, the fairness of the bandwidth allocation and the jittering of transmission delay can be improved.

The embodiments mentioned in this specification can be arbitrarily combined or used alone when applied in a network to improve the efficiency of data uploading.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A method of allocating a bandwidth of a network, the network including an office terminal and a plurality of peripheral terminals that communicate with the office terminal by time division multiplexing during a sequence of transmitting cycles, the method comprising:
   receiving a predicting bandwidth of a predetermined one of the peripheral terminals, the predicting bandwidth being based on an amount of data expected to be transmitted to the predetermined one of the peripheral terminals during one of the transmitting cycles;
   receiving a waiting bandwidth of the predetermined one of the peripheral terminals, the waiting bandwidth defining an amount of data waiting to be transmitted from the predetermined one of the peripheral terminals to the office terminal during said one of the transmitting cycles;
   adjusting the predicting bandwidth based on a weight value;
   generating a requested bandwidth for the predetermined one of the peripheral terminals by adding the adjusted predicting bandwidth to the waiting bandwidth; and
   allocating a transmitting bandwidth to determine an amount of data that can be uploaded by the predetermined one of the peripheral terminals through the network based on the requested bandwidth.

2. The method of claim 1, further comprising:
   calculating an amount of network loading in a transmitting cycle; and
   obtaining the weight value based on the calculated amount of network loading.

3. The method of claim 2, wherein the weight value decreases as the calculated amount of the network loading increases.

4. The method of claim 1, wherein the predicting bandwidth of the predetermined one of the peripheral terminals is the amount of the data uploaded in the last transmitting cycle by the predetermined one of the peripheral terminals.

5. A method of allocating a bandwidth of a network, the network including an office terminal and a plurality of peripheral terminals that communicate with the office terminal by time division multiplexing during a sequence of transmitting cycles, the method comprising:
   receiving a requested bandwidth from at least one requesting peripheral terminal among the plurality of peripheral terminals;
   allocating a transmitting bandwidth based on an assured bandwidth and the requested bandwidth of each of the at least one requesting peripheral terminals;
   defining the requested bandwidth based on the allocated transmitting bandwidth;
   allocating an excess bandwidth based on a remaining bandwidth of the network corresponding to each requesting peripheral terminal among the plurality of peripheral terminals, which has a corresponding unsatisfied requested bandwidth, including:
      calculating the remaining bandwidth according to a usable bandwidth and the allocated transmitting bandwidth of the network in a transmission cycle,
      calculating an allocatable extra bandwidth for each of the at least one requesting peripheral terminal according to a maximum bandwidth and a bandwidth compensation value for each of the at least one requesting peripheral terminal and the remaining bandwidth, and
      allocating the excess bandwidth according to each of the corresponding unsatisfied requested bandwidths and the allocatable extra bandwidth for adjusting the transmitting bandwidth of the peripheral terminal;
   adjusting the allocated transmitting bandwidth for each requesting peripheral terminal having the corresponding unsatisfied requested bandwidth; and
   adjusting the bandwidth compensation value based on the last transmitting bandwidth of each of the peripheral terminals for each of the peripheral terminals.

6. The method of claim 5, further comprising:
   adjusting the requested bandwidth of each of the requesting peripheral terminals based on a maximum transmitting bandwidth limitation of the transmitting cycle.

7. The method of claim 6, wherein the step of adjusting the requested bandwidth of the terminal based on a maximum comprises:
   comparing the requested bandwidth and the maximum transmitting bandwidth limitation of the at least one requesting peripheral terminal; and
   replacing the requested bandwidth with the maximum transmitting bandwidth limitation if the requested bandwidth is larger than the maximum transmitting bandwidth limitation, by the maximum transmitting bandwidth limitation for being the requested.

8. The method of claim 6, wherein the maximum transmitting bandwidth limitation is between the maximum bandwidth and twice the maximum bandwidth.

9. The method of claim 5, wherein the step of allocating a transmitting bandwidth further comprises:

comparing the assured bandwidth and the requested bandwidth for each of the at least one requesting peripheral terminal;

allocating the transmitting bandwidth corresponding to the assured bandwidth if the requested bandwidth is larger than the assured bandwidth; and allocating the transmitting bandwidth corresponding to the requested bandwidth if the requested bandwidth is smaller or equal to the assured bandwidth.

10. The method of claim 5, wherein the step of defining the requested bandwidth comprises:

comparing the allocated transmitting bandwidth and the requested bandwidth for each of the at least one requesting peripheral terminal; and indicating that the requested bandwidth is unsatisfied if the requested bandwidth is larger than the allocated transmitting bandwidth.

11. The method of claim 5, wherein the remaining bandwidth is calculated by subtracting the usable bandwidth from the allocated transmitting bandwidth.

12. The method of claim 5, wherein the step of calculating an allocatable extra bandwidth of the each terminal according to a maximum bandwidth and a bandwidth compensation value of the each terminal and the remaining bandwidth comprising comprises:

calculating the extra bandwidth of the each terminal where has an unsatisfied requested bandwidth by the following formula;

$$B\_extra_k = \frac{B\_max_k - B\_add_k}{\sum (B\_max_k - B\_add_k)} \times B\_left_n, k \in K$$

where B_extrak is the extra bandwidth, B_maxk is the maximum bandwidth, B_addk is the bandwidth compensation value, B_leftn is the remaining bandwidth, K is a class of the terminals where has unsatisfied requested bandwidths, k is the terminal in the K, and n is the nth transmitting cycle wherein K, k, and n are positives respectively.

13. The method of claim 5, wherein the step of allocating the excess bandwidth comprises:

calculating a remaining requested bandwidth for each of the at least one requesting peripheral terminal based on the requested bandwidth and the allocated transmitting bandwidth for each of the at least one requesting peripheral terminal;

comparing the remaining requested bandwidth and the extra bandwidth for each of the at least one requesting peripheral terminal;

allocating the excess bandwidth corresponding to the extra bandwidth for each of the at least one requesting peripheral terminal for adjusting the transmitting bandwidth for each of the requesting peripheral terminals if the remaining requested bandwidth is larger than the extra bandwidth; and allocating the excess bandwidth corresponding to the remaining requested bandwidth to the terminal for each of the at least one requesting peripheral terminal for adjusting the transmitting bandwidth of the peripheral terminal if the remaining requested bandwidth is smaller or equal to the extra bandwidth.

14. The method of claim 13, wherein the remaining requested bandwidth is obtained by subtracting the requested bandwidth from the allocated transmitting bandwidth.

15. The method of claim 5, wherein the step of adjusting the bandwidth compensation value comprises: comparing the last transmitting bandwidth and the maximum bandwidth for each of the at least one requesting peripheral terminal:

subtracting the maximum bandwidth from the allocated transmitting bandwidth to obtain an excess use portion if the last transmitting bandwidth is larger than the maximum bandwidth;

subtracting the maximum bandwidth from the transmitting bandwidth to obtain an un-used bandwidth if the transmitting bandwidth is smaller than the maximum bandwidth; and updating the bandwidth compensation value based on one of the excess use portion and the un-used bandwidth.

16. The method of claim 5, wherein the step of adjusting the bandwidth compensation value comprises:

comparing the last transmitting bandwidth, the maximum bandwidth and the requested bandwidth for each of the at least one requesting peripheral terminal;

subtracting the maximum bandwidth from the allocated transmitting bandwidth to obtain an excess use portion if the last transmitting bandwidth is larger than the maximum bandwidth;

subtracting the maximum bandwidth from the transmitting bandwidth to obtain an un-used bandwidth if the transmitting bandwidth is smaller than the maximum bandwidth but larger than the requested bandwidth;

subtracting the transmitting bandwidth from the requested bandwidth to obtain a remaining requested bandwidth if the transmitting bandwidth is smaller than the maximum bandwidth and also smaller than the requested bandwidth; and updating the bandwidth compensation value based on one of the excess use portion, the remaining requested bandwidth and the un-used bandwidth.

17. A method of allocating a bandwidth of a network, the network including an office terminal and a plurality of peripheral terminals that communicate with the office terminal by time division multiplexing during a sequence of transmitting cycles, the method further allocating a remaining bandwidth of a passive optical network to the peripheral terminals based on a remaining requested bandwidth after a transmitting bandwidth is allocated, the transmitting bandwidth being based on a plurality of requested bandwidths of the peripheral terminals, the remaining requested bandwidth being part of the requested bandwidth which is not satisfied by the transmitting bandwidth, the method comprising:

allocating at least one transmitting bandwidth; calculating a remaining bandwidth of the network based on an allocated transmitting bandwidth and a usable bandwidth of the network in a transmitting cycle;

calculating at least one allocatable extra bandwidth corresponding to the remaining requested bandwidth based on a maximum bandwidth and a bandwidth compensation value of each of the peripheral terminals and the remaining bandwidth;

allocating the excess bandwidth based on the remaining requested bandwidth and the extra bandwidth for adjusting the transmitting bandwidth of the peripheral terminals; and adjusting the bandwidth compensation value based on the last transmitting bandwidth of each of the peripheral terminals.

18. The method of claim 17, wherein the calculation of the remaining bandwidth is obtained by subtracting the usable bandwidth from the allocated transmitting bandwidth.

19. The method of claim 17, the step of calculating at least one allocatable extra bandwidth comprising:
calculating the extra bandwidth allocatable to the terminal which corresponds to the remaining requested bandwidth by the following formula;

$$B\_extra_k = \frac{B\_max_k - B\_add_k}{\sum (B\_max_k - B\_add_k)} \times B\_left_n, k \in K$$

where B_extrak is the extra bandwidth, B_maxk is the maximum bandwidth, B_addk is the bandwidth compensation value, B_leftn is the remaining bandwidth, K is a class of the terminals which correspond to the unsatisfied requested bandwidths, k is the terminal in the K, and n is the nth transmitting cycle wherein K, k, and n are positives respectively.

20. The method of claim 17, the step of allocating the excess bandwidth based on the remaining requested bandwidth and. the extra bandwidth comprising:
comparing the remaining requested bandwidth and the extra bandwidth for the peripheral terminal;
allocating the excess bandwidth corresponding on to the extra bandwidth to the peripheral terminal for adjusting the transmitting bandwidth of the peripheral terminal if the remaining requested bandwidth is larger than the extra bandwidth; and
allocating the excess bandwidth corresponding to the remaining requested bandwidth to the peripheral terminal for adjusting the transmitting bandwidth of the peripheral terminal if the remaining requested bandwidth is smaller or equal to the extra bandwidth.

21. The method of claim 17, after the step of allocating the excess bandwidth, further comprising:
identifying the remaining requested bandwidth based on the requested bandwidth and the allocatable transmitting bandwidth; and
going back to the step of calculating the remaining bandwidth if there exists the remaining requested bandwidth.

22. The method of claim 17, after the step of allocating the excess further comprising:
cumulating a number of allocations;
identifying the remaining requested bandwidth based on the requested bandwidth and the allocatable transmitting bandwidth and identifying an accumulated value based on a predetermined value; and
going back to the step of calculating the remaining bandwidth if there exists the remaining requested bandwidth and the number of allocation doesn't reach the predetermined value.

* * * * *